(12) United States Patent
Steelberg et al.

(10) Patent No.: US 11,017,780 B2
(45) Date of Patent: May 25, 2021

(54) SYSTEM AND METHODS FOR NEURAL NETWORK ORCHESTRATION

(71) Applicant: Veritone, Inc., Costa Mesa, CA (US)

(72) Inventors: Chad Steelberg, Newport Beach, CA (US); Peter Nguyen, Costa Mesa, CA (US); David Kettler, Bellevue, WA (US); Karl Schwamb, Mission Viejo, CA (US); Yu Zhao, Irvine, CA (US)

(73) Assignee: VERITONE, INC., Costa Mesa, CA (US)

( * ) Notice: Subject to any disclaimer, the term of this patent is extended or adjusted under 35 U.S.C. 154(b) by 0 days.

(21) Appl. No.: 16/287,892

(22) Filed: Feb. 27, 2019

(65) Prior Publication Data

US 2020/0066278 A1    Feb. 27, 2020

Related U.S. Application Data

(63) Continuation-in-part of application No. 16/243,033, filed on Jan. 8, 2019, and a continuation-in-part of
(Continued)

(51) Int. Cl.
| | |
|---|---|
| *G10L 15/32* | (2013.01) |
| *G10L 15/02* | (2006.01) |
| *G10L 15/18* | (2013.01) |
| *G06N 3/08* | (2006.01) |
| *G10L 15/16* | (2006.01) |
| *G10L 15/30* | (2013.01) |
| *G06N 5/00* | (2006.01) |
| *G06N 20/00* | (2019.01) |

(Continued)

(52) U.S. Cl.
CPC .............. *G10L 15/32* (2013.01); *G06F 40/20* (2020.01); *G06F 40/253* (2020.01); *G06F 40/284* (2020.01); *G06F 40/30* (2020.01); *G06N 3/0445* (2013.01); *G06N 3/0454* (2013.01); *G06N 3/08* (2013.01); *G06N 5/003* (2013.01); *G06N 20/00* (2019.01); *G10L 15/02* (2013.01); *G10L 15/16* (2013.01); *G10L 15/1815* (2013.01); *G10L 15/30* (2013.01); *G06N 3/0472* (2013.01)

(58) Field of Classification Search
CPC ..... G10L 15/32; G10L 15/02; G10L 15/1815; G10L 15/16; G10L 15/30; G06N 3/0445; G06N 3/0454; G06N 5/003; G06N 20/00; G06N 3/08; G06N 3/0472; G06F 40/20; G06F 40/30; G06F 40/253; G06F 40/284
USPC ......................................................... 704/235
See application file for complete search history.

(56) References Cited

U.S. PATENT DOCUMENTS 6,304,864 B1 * 10/2001 Liddy .................. G06F 16/9535
706/15
9,892,344 B1 * 2/2018 Tran ...................... G06K 9/6256
(Continued)

*Primary Examiner* — Edwin S Leland, III
(74) *Attorney, Agent, or Firm* — One LLP

(57) ABSTRACT

Methods and systems for classifying a multimedia file using interclass data is disclosed. One of the methods can use classification results from one or more engines of different classes to select a different engine for the original classification task. For example, given an audio segment with associated metadata and image data, the disclosed interclass method can use the classification results from a topic classification of metadata and/or an image classification result of the image data as inputs for selecting a new transcription engine to transcribe the audio segment.

11 Claims, 14 Drawing Sheets

Related U.S. Application Data application No. 16/109,516, filed on Aug. 22, 2018, now abandoned, which is a continuation of application No. 16/052,459, filed on Aug. 1, 2018, now abandoned.

(60) Provisional application No. 62/713,937, filed on Aug. 2, 2018, provisional application No. 62/735,769, filed on Sep. 24, 2018, provisional application No. 62/638,745, filed on Mar. 5, 2018, provisional application No. 62/633,023, filed on Feb. 20, 2018, provisional application No. 62/540,508, filed on Aug. 2, 2017.

(51) Int. Cl.
*G06N 3/04* (2006.01)
*G06F 40/20* (2020.01)
*G06F 40/30* (2020.01)
*G06F 40/253* (2020.01)
*G06F 40/284* (2020.01)

(56) References Cited

U.S. PATENT DOCUMENTS

| | | | |
|---|---|---|---|
| 10,049,308 B1* | 8/2018 | Dhua | G06N 3/0472 |
| 10,460,175 B1* | 10/2019 | Gould | G06N 3/0454 |
| 2017/0046613 A1* | 2/2017 | Paluri | G06N 3/0454 |
| 2017/0116521 A1* | 4/2017 | Wang | G06N 3/0454 |
| 2017/0206431 A1* | 7/2017 | Sun | G06F 16/5838 |
| 2020/0058307 A1* | 2/2020 | Steelberg | G10L 15/02 |
| 2020/0066278 A1* | 2/2020 | Steelberg | G06N 3/0454 |
| 2020/0075019 A1* | 3/2020 | Steelberg | G10L 15/1815 |

* cited by examiner

SYSTEM AND METHODS FOR NEURAL NETWORK ORCHESTRATION

CROSS-REFERENCE TO RELATED APPLICATIONS

This application is a continuation-in-part of U.S. patent application Ser. No. 16/243,033, filed Jan. 8, 2019, which claims priority to U.S. Provisional Application No. 62/713,937, filed Aug. 2, 2018, claims priority to U.S. Provisional Application No. 62/735,769, filed Sep. 24, 2018, and is a continuation-in-part of U.S. patent application Ser. No. 16/109,516, filed Aug. 22, 2018, which is a continuation of U.S. patent application Ser. No. 16/052,459, filed Aug. 1, 2018, which claims priority to U.S. Provisional Application No. 62/638,745, filed Mar. 5, 2018, U.S. Provisional Application No. 62/633,023, filed Feb. 20, 2018, and U.S. Provisional Application No. 62/540,508, filed Aug. 2, 2017 the disclosures of which are incorporated herein by reference in their entireties for all purposes.

This application is related to the subject matter disclosed in U.S. patent application Ser. No. 16/243,037, filed Jan. 8, 2019, the disclosure of which is incorporated herein by reference in its entirety for all purposes.

BACKGROUND

Based on one estimate, 90% of all data in the world today are generated during the last two years. Quantitatively, that is more than 2.5 quintillion bytes of data are being generated every day; and this rate is accelerating. This estimate does not include ephemeral media such as live radio and video broadcasts, most of which are not stored.

To be competitive in the current business climate, businesses should process and analyze big data to discover market trends, customer behaviors, and other useful indicators relating to their markets, product, and/or services. Conventional business intelligence methods traditionally rely on data collected by data warehouses, which is mainly structured data of limited scope (e.g., data collected from surveys and at point of sales). As such, businesses must explore big data (e.g., structured, unstructured, and semi-structured data) to gain a better understanding of their markets and customers. However, gathering, processing, and analyzing big data is a tremendous task to take on for any corporation.

Additionally, it is estimated that about 80% of the world data is unreadable by machines. Ignoring this large portion of unreadable data could potentially mean ignoring 80% of the additional data points. Accordingly, to conduct proper business intelligence studies, businesses need a way to collect, process, and analyze big data, including machine unreadable data.

SUMMARY

Provided herein are embodiments of systems and methods for classifying a media file (e.g., audio, video, multimedia file). One of the methods for classifying a first media segment of a first data type having a corresponding media segment of a second data type includes: extracting a first set of media features of the first media segment of the first data type; generating, using an engine prediction neural network, a best candidate neural network based at least on the first set of media features; determining whether a predicted value of accuracy of the best candidate neural network is above a predetermined accuracy threshold; when the predicted value of accuracy of the best candidate neural network is below the predetermined accuracy threshold, classifying the corresponding media segment of a second data type using a second classification neural network; and selecting, based at least on results of the classification of the corresponding media segment of a second data type, a third classification neural network to classify the first media segment of the first data type.

The best candidate neural network can be a neural network having a highest predicted value of accuracy. The first and second data types can be data of different classes. For example, the first type of data can be audio data and the second type of data can be image data or metadata. The third classification neural network and the best candidate neural network are different.

In the above method, extracting the first set of media features of the first data type includes extracting audio features of the first media segment using outputs of one or more layers of a speech-to-text classification neural network. The first data type can be audio data and the corresponding media segment of second data type can image data, transcription data, or metadata.

The corresponding media segment can span a duration of 30 seconds before and after from when the first media segment occurs within a multimedia file. For example, the first segment can occur at the 9 minutes playtime timestamp, Additionally, the process of extracting the first set of media features of the first data type can comprise extracting image features of the first media segment by using outputs of one or more layers of an image classification neural network. The first data type can be image data and the corresponding media segment of second data type can be audio data, transcription data, or metadata.

The process of classifying the corresponding media segment of a second data type using the second classification neural network can include: extracting a second set of media features of the corresponding media segment of the second data type; and generating, using the engine prediction neural network, a best candidate neural network based at least on the second set of media features. The second classification neural network can be the best candidate neural network.

The process of extracting the first set of media features of the first data type can include extracting the first set of media features of the first media segment using outputs of one or more hidden layers of a fourth classification neural network trained to classify data of the first data type. The first data type can be audio data, image data, transcription data, or metadata.

The engine prediction neural network can be pre-trained to associate outputs of the one or more hidden layers of the fourth classification neural network with predicted classification performances of a plurality of neural network. The first set of media features can be extracted from a last hidden layer of the fourth classification neural network. The first set of media features can also be extracted from the first and the last hidden layers of the fourth classification neural network.

The process of selecting the third image classification neural network can include: determining context of the corresponding media segment based at least on the classification result of the corresponding media segment received from the second classification neural network; and selecting the third classification neural network based on the determined context.

A second method for classifying a portion of an image is also disclosed, the second method includes: segmenting the image into a plurality of image portions; extracting image features of a first image portion of the plurality of image portion using a first image classification engine; inputting the extracted image features into an engine prediction neural network to generate a list of one or more best candidate engines; determining a predicted accuracy value for each best candidate engines; if none of the best candidate engines has a predicted accuracy value above a predetermined accuracy threshold, identifying an alternate data set associated with the first image portion, the alternate data set comprises non-image data; requesting a second classification engine to classify the alternate data set; receiving, from the second classification engine, a second classification result of the alternate data set; and selecting, based at least on the second classification result of the alternate data set, a third image classification engine to re-classify the portion of the image. The second classification engine is trained to classify data in a same class as the alternate data set. The first and third image classification engines can be different.

A system for classifying a first media segment of a first data type having a corresponding media segment of a second data type is also disclosed, the system includes: a memory; and one or more processors coupled to the memory. The one or more processors are configured to: extract a first set of media features of the first media segment of the first data type; generate, using an engine prediction neural network, a best candidate neural network based at least on the first set of media features; determine whether a predicted value of accuracy of the best candidate neural network is above a predetermined accuracy threshold; when the predicted value of accuracy of the best candidate neural network is below the predetermined accuracy threshold, classify the corresponding media segment of a second data type using a second classification neural network; and select, based at least on results of the classification of the corresponding media segment of a second data type, a third classification neural network to classify the first media segment of the first data type. The first and second data types can be different. The best candidate neural network can be a neural network having a highest predicted value of accuracy, and the third classification neural network and the best candidate neural network can be different.

Other features and advantages of the present invention will be or will become apparent to one with skill in the art upon examination of the following figures and detailed description, which illustrate, by way of examples, the principles of the present invention.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

Figure 1:
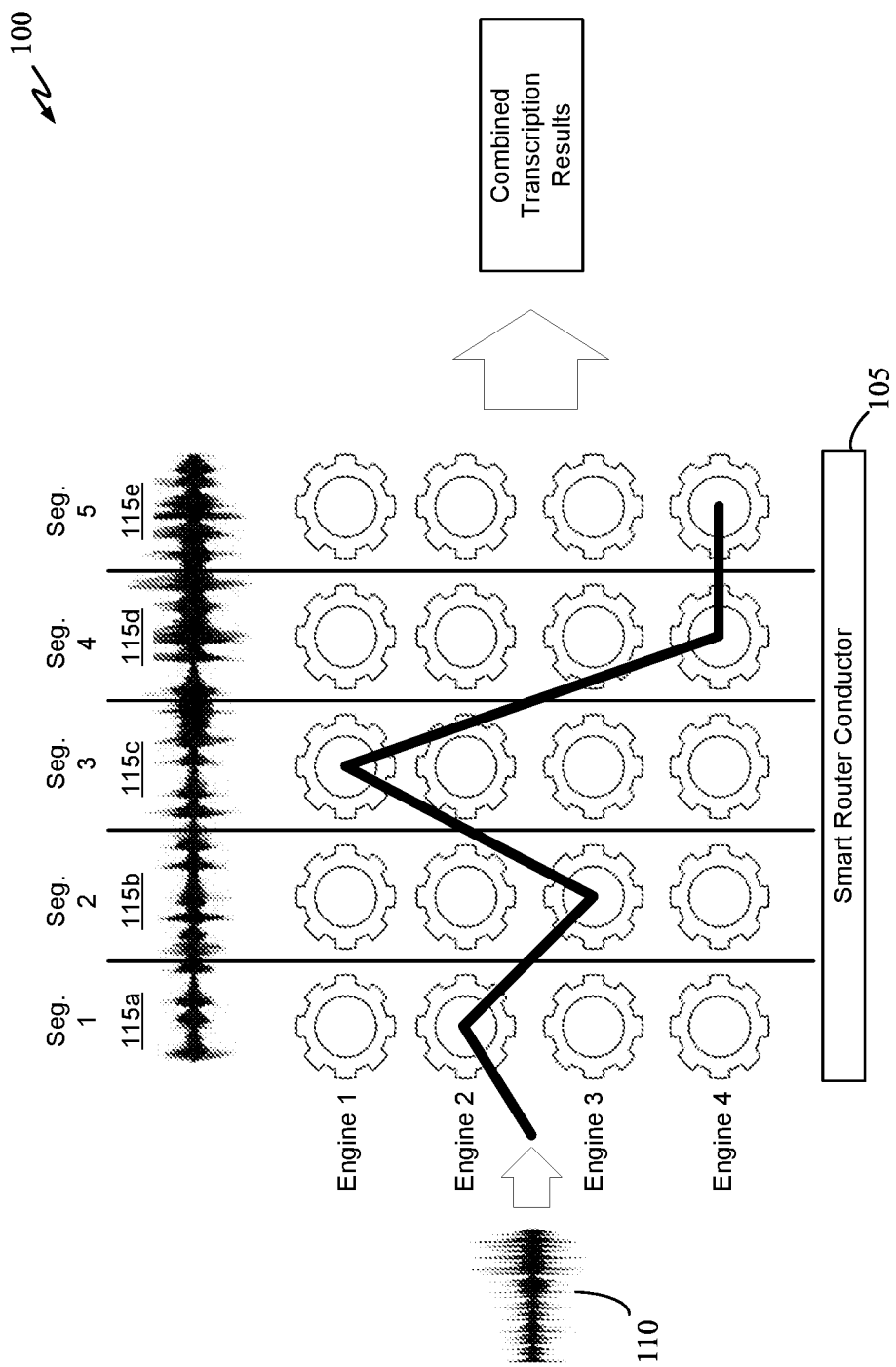
FIG. 1 illustrates a neural network orchestration process in accordance with an aspect of the disclosure.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Overview

At the beginning of the decade (2010), there were only a few available commercial artificial intelligence (AI) engines. Today, there are well over 10,000 AI engines. It is expected that this number will exponentially increase within the next few years. With so many commercially available engines, it is almost an impossible task for businesses to choose which engines will perform the best for their type of data. Veritone's AI platform with the conductor and conducted learning technologies make that task not only possible but also practical and efficient.

In some embodiments, the conductor and conducted learning technologies use machine learning, which is an algorithm that is able to learn from data. For example, a computer program is said to learn from experience 'E' with respect to some class of tasks 'T' and performance measure 'P', if its performance at tasks in 'T', as measured by 'P', improves with experience 'E'. Examples of machine learning algorithm may include, but not limited to: a deep learning neural network; a feedforward neural network, a convolutional neural network, and a generative adversarial neural network.

For audio transcription, selecting an AI engine that would yield the best transcription accuracy can be a daunting task given the dynamic of an audio file and the number of available transcription engines. A trial and error approach for selecting an engine (e.g., AI engine, neural network engine) to transcribe the audio file can be time consuming, cost prohibitive, and inaccurate. Veritone's AI platform with the smart router conductor (SRC) technology enables a smart, orchestrated, and accurate approach to engine selection that yields a highly accurate classification transcription of the audio file. Additionally, where one or more segments of the audio file that have persistently low transcription accuracy, the SRC can use metadata, image(s), and/or video associated with the audio file to determine an alternative transcription engine(s) that can better transcribe the audio segment. The SRC can perform interclass (e.g., audio and video data) neural network orchestration to obtain better transcription results by using a classification result obtained by another engine of a different class (e.g., object classification, color classification, gender classification, facial recognition) as an input for selecting an alternative transcription engine. This also works the other way around. The SRC can also use a classification result obtained by a transcription engine to help select the best candidate engine for other classification tasks such as, but not limited to, facial recognition, voice/speaker recognition, object recognition, and color recognition. For example, an engine may have problem correctly classifying an image of a humming bird. However, the SRC with interclass neural network orchestration (interclass SRC) can analyze the audio track associate with the image and determine that the speaker is talking about a humming bird. Using this information, the interclass SRC can select an engine specialized in classifying animal or bird images to better or correctly re-classify the image as a humming bird.

In another example, a transcribed portion of an audio segment, returned by a transcription engine, "the Maria" can appear to be a proper pronoun. The transcribed portion "the Maria" can have a low to medium confidence of accuracy. In some embodiments, the SRC can be configured to automatically reanalyze the audio segment associated with the transcribed portion that have a confidence of accuracy below a certain accuracy threshold (e.g., 60%). The SRC can reanalyze the low confidence audio segment (i.e., the audio segment having the transcribed portion with a low confidence of accuracy) using a different engine that was used in the previous cycle. The SRC can select a different engine based on other data associated with the audio segment such as the image/video portion of a multimedia—with the audio segment being the audio portion of the multimedia. Other data associated with the audio segment can also be, but not limited to, metadata. With the "the Maria" example, the SRC (which can include the interclass SRC) can classify the image associated with the audio segment having the "the Maria" transcript using an image classification engine. The image classification result can show, with a high level of confidence, that the image is of the soccer player "Di Maria." Using this image classification result, the SRC can reclassify the audio segment as "Di Maria." This can be done by replacing the original transcription (the Maria) with metadata of the image (e.g., tag data). In some embodiments, the SRC can select a different classification engine (typically a specialized engine) based on the image classification result. In this case, the SRC can select a specialized sports or soccer engine to re-classify the audio segment, which can have a much higher probability of transcribing the audio segment correctly as "Di Maria" rather than "the Maria."

In another example, a transcribed portion "Ben Roth likes burger" can have a confidence of accuracy below a desirable threshold. The SRC can recognize this and send the low confidence audio segment to another specialized engine (e.g., micro-engine, which is trained to perform a specific type of classification) to re-transcribe the audio segment. There can be many specialized engines in the conductor system. The SRC can select a specialized engine based at least on one or more of the topic and/or and metadata associated with the audio segment. The topic can be determined using a topic classification engine to classify metadata associated with the audio segment or additional audio data before and after the original audio segment. For example, the audio segment may be too short for topically classification, accordingly, audio portions before and/or after the audio segment can be used for topical classification. For instance, the entire input media file rather than a segment of the media file can be used to determine the topic. In this example, the topic classification can classify the audio segment (or audio portions surrounding the audio segment) to have football as a topic. Since the topic is football, the SRC can select a specialized sports or football engine to re-classify the low confidence audio segment as "Ben Roethlisberger." Next, the SRC can also use low confidence audio segment and the correct classification to retrain the original engine or another micro-model.

The audio features of most audio files can be very dynamic. In other words, for a given audio file, the dominant features of the audio file can change from one segment of the audio file to another. For example, the first quarter segment of the audio file can have a very noisy background thereby giving rise to certain dominant audio features. The second quarter segment of the audio file can have multiple speakers, which can result in a different set of dominant audio features. The third and fourth quarter segments can have different scenes, background music, speakers of different dialects, etc. Accordingly, the third and fourth quarter segments can have different sets of dominant audio features. Given the dynamic nature of audio features of the audio file, it would be hard to identify a single transcription engine that can accurately transcribe all segments of the audio file. Furthermore, a one engine fits all approach will generally yield a low accuracy result.

The smart router conductor technology can segment an audio file by duration, audio features, topic, scene, metadata, a combination thereof, etc. In some embodiments, an audio file can be segmented by duration of 2-60 seconds. For example, the audio file can be segmented into a plurality of 5-second segments. In some embodiments, an audio file can be segmented by topic and duration, scene and duration, metadata and duration, etc. For example, the audio file can first be segmented by scenes. Then within each scene segment, the segment is segmented into 5-second segments. In another example, the audio file can be segmented by duration of 30-second segments. Then within each 30-second segment, the segment can be further segmented by topic, dominant audio feature(s), metadata, etc. Additionally, the audio file can be segmented at a file location where no speech is detected. In this way, a spoken word is not separated between two segments.

In some embodiments, for each segment of the audio file, the smart router conductor can predict one or more engines that can best transcribe the segment based at least on audio feature(s) of the segment. The best-candidate engine(s) can depend on the nature of the input media and the characteristics of the engine(s). In speech transcription, certain engines will be able to process certain dialects better than others while some engines are better at processing noisy audio than others. Accordingly, it is advantageous to select, at the front end, engine(s) that will perform well based on characteristics (e.g., audio features) of each segment of the audio file.

FIG. 1 graphically illustrates an engine orchestration process 100 of a smart router conductor 105 in accordance with some embodiments of the present disclosure. Process 100 includes an ecosystem of four pre-orchestrated transcription engines, engines 1 through 4. A pre-orchestrated engine can be an engine that has been used in the training process of an engine prediction neural network, which is trained to predict one or more best candidate engines to transcribe one or more segments of a media file based on characteristics (e.g., audio spectrograms) of the media file. A best candidate classification engine is an engine having a predicted high level of classification accuracy for a given input media file. For example, a best candidate transcription engine is a transcription engine having a predicted high level of transcription accuracy for a given audio file. In another example, a best candidate objection recognition is an object recognition engine having a predicted high level of object recognition accuracy. Although process 100 shows only four engines being orchestrated, process 100 can include tens or hundreds of pre-orchestrated engines.

For image classification, a pre-orchestrated engine can be an engine that has been used in the training process of an engine prediction neural network, which is trained to predict one or more best candidate engines to classify an image or one or more segments of the image based on image features of the image or the one or more segments.

The trained engine prediction neural network can be part of smart router conductor 105. In a transcription use case, the engine prediction neural network can take as inputs the outputs of one or more hidden layers of a neural network trained to perform speech recognition (e.g., speech-to-to text classification) and can output one or more best candidate transcription engines. In an objection recognition use case, the engine prediction neural network can take as inputs the outputs of one or more hidden layers of a neural network trained to perform image/object recognition and can output one or more best candidate image/object recognition engines.

The engine prediction neural network can also be trained to predict one or more best candidate engines based on topics (e.g., sports, medicine, law), audio setting (e.g., library, football stadium, concert), spoken language (e.g., slang, accent, Cantonese, French), and image data obtained from image and/or object recognition. Accordingly, SRC 105 can route a segment based on a segment's characteristics such as, but not limited to, audio features, topics, language spoken, detected accent, background noise, and image data obtained from image and/or object classification. Pre-orchestrated engines in the conductor ecosystem can include engine specialized in various languages, topics, accent, noise environment, etc. For example, pre-orchestrated engines can include a German dialect engine, a Northern Ireland dialect engine, a sport engine, a soccer engine, a legal engine, a financial topic engine, a medical specialized engine.

In process 100, an input media file 110 can be audio file or a multimedia file (e.g., audio file with images/video). The audio portion of input media file 110 can be segmented into a plurality of segments. As shown, the audio portion of input media file 110 is segmented into five segments (115a through 115c). FIG. 1 graphically illustrates how SRC 105 can route each segment of input media file 110 to a group of four transcription engines based at least on features of each audio segment. Here, smart router conductor 105 can route segment 115a to engine 2 based on audio features (e.g., audio spectrogram) of segment 115a, and can route segment 115b to engine 3 based on audio features of segment 115b. Segments 115c is routed to engine 1, and segments 115d and 115e are both routed to engine 4. If the confidence of accuracy of the transcribed portion for each segment is above a certain accuracy threshold, a combined transcription output can be produced using the outputs of engines 1-4. For segments 115a-e, the transcription route path can be 2-3-1- 4-4 for the first round of transcription. If all segments have a high confidence of accuracy, the transcription process can be concluded. If any of the transcribed portion has a low confidence of accuracy, smart router conductor 105 can select another transcription engine to re-transcribe the audio segment corresponding to the transcribed portion having a low confidence of accuracy.

In some embodiments, SRC 105 (with interclass capability) can orchestrate neural networks trained to classify different classes than the original classification objective to better select the next best classification engine for the original classification. For example, for speech-to-text classification, the SRC can use outputs of neural networks trained to classify different classes such as, but not limited to, image/object classification, topic classification, context classification, and sentiment classification (which are all different classes than transcription) to better select an alternative transcription engine. In another example, for object recognition, SRC 105 can use outputs of a transcription engine or topic classification engine to select the alternative transcription engine based on the transcription result and/or the topic classification result. The above SRC interclass orchestration feature can be executed after the initial cycle of classification to improve the classification of subsequent cycle(s) by selecting more appropriate engines to re-classify any low confidence classification.

SRC 105 can also perform interclass orchestration before the first cycle of classification is commenced or completed. In other words, interclass orchestration can be performed before requesting one of the identified best candidate engines to transcribe an audio segment. For example, SRC 105 can perform interclass orchestration on one or more segments 115a-115e when the engine prediction neural network fails to identify best candidate engine(s) with a certain expected value of accuracy. For instance, for a very noisy audio segment, the engine prediction neural network can only identify transcription engine(s) with a predicted accuracy of less than 55% or engine(s) with a word error rate (WER) above a certain threshold. For example, assuming segment 115d is very noisy and the engine prediction neural network can only identify a best candidate engine with a 30% WER. In this example, rather than requesting engine 4 to transcribe segment 115d, SRC 105 can perform interclass orchestration by requesting an image/object classification engine to classify an image associated with segment 115d and then using the classification result of the image/object classification engine to select another transcription engine.

SRC 105 can use classification results from one or more engines of different classes to select a different engine for the original classification task. For example, given an audio segment with associated metadata and image data, SRC 105 can use the classification results from a topic classification of the metadata and an image classification of the image data as inputs for selecting a new transcription engine to transcribe the audio segment. In this example, classifications of speech-to-text, metadata to topic, and an image to image/object identification are referred to as interclass classification. SRC 105 can use classification results from one or more interclass classifications to improve the engine selection process. In another example, given a facial classification task on a video with audio data, SRC 105 can perform classification on the audio data associated with the video and use the classification result as one of the variables for selecting a facial recognition engine. For instance, the engine prediction neural network of SRC 105 can generate a list of best candidate engines based at least on image features of an image of the video. Image features can be outputs of one or more layers of an image classification neural network, such as, but not limited to, a VGG (Visual Geometry Group) convolutional neural network. The outputs from the one or more layers of the image classification are then used as inputs to the engine prediction neural network of SRC 105, which generates the list of best candidate facial classification engines. However, assuming that the best engine in the list of best candidate engines only has a predicted accuracy of 45%, SRC 105 can also use the classification result from the corresponding audio data to tailor the field of engines to be orchestrated. In this example, transcription of the corresponding audio data can be "touchdown, what a pass!" Based on this classification of the audio data, SRC 105 can orchestrate only facial classification engines specialized for sports. This can be done by using an engine prediction neural network that is trained to only orchestrate sport-specialized image classification engines. In this way, the next list of best candidate engines can have a much higher rate of accuracy.

The engine prediction neural network can be a dynamic entity, it can be a collection of engine prediction neural networks trained to orchestrate different type (e.g., class) of engines. When SRC 105 performs interclass orchestration, it can select an appropriate engine prediction neural network based on at least on the type of classification task to be performed and/or the type of data being classified. For example, for a color classification task, SRC 105 can select an engine prediction neural network trained to generate a list of best candidate color classification engines. It should be noted that the list of best candidate engines can have one or more engines. In another example, for a transcription task of a legal proceeding, SRC 105 can select an engine prediction neural network trained to generate a list of best candidate transcription engines that are specialized in the legal field.

Figure 2:
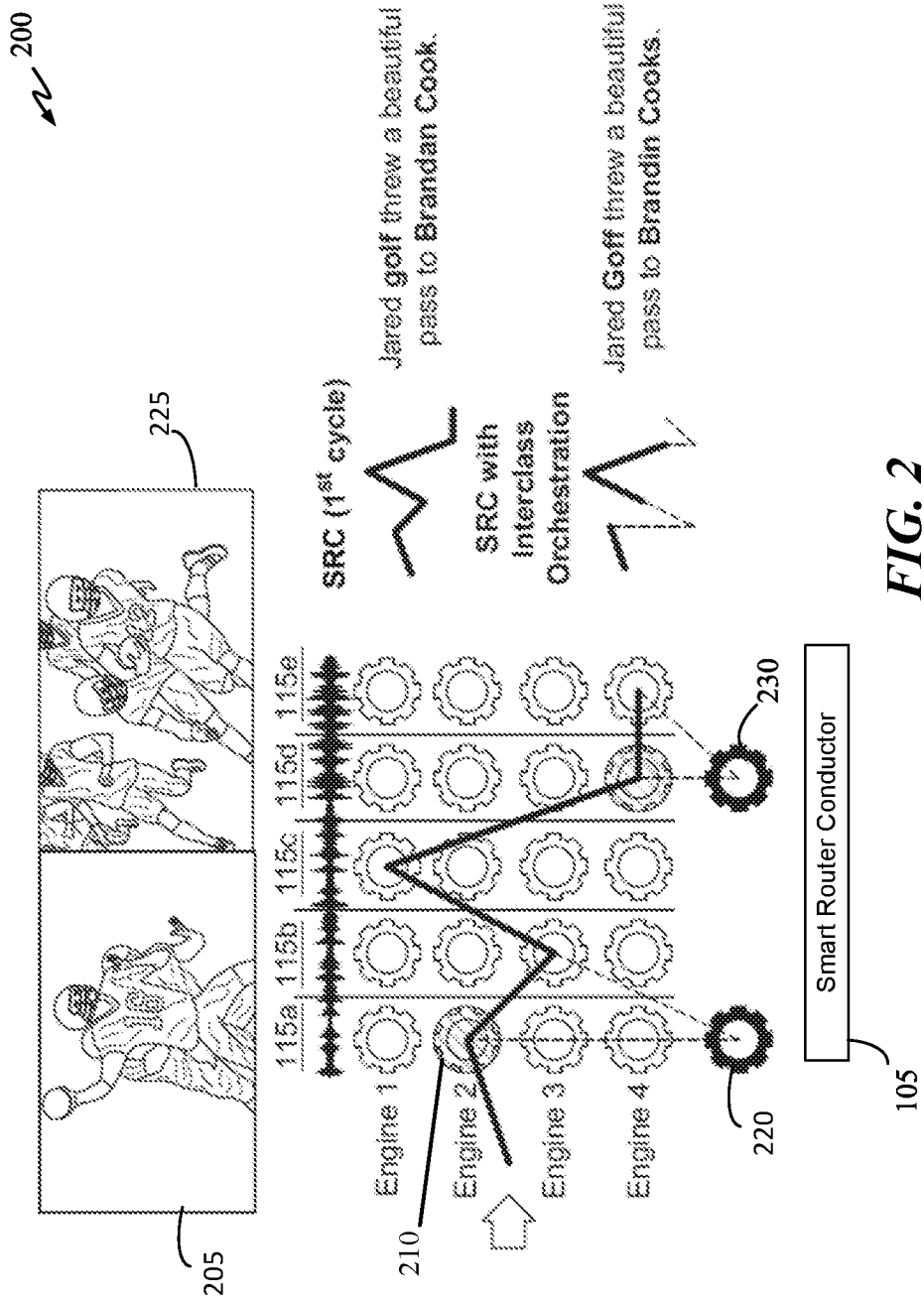
FIG. 2 illustrates a neural network orchestration process using interclass data in accordance with an aspect of the disclosure.

FIG. 2 illustrates an interclass orchestration process 200 in accordance with some embodiments of the present disclosure. In this example, the main task of process 200 is to transcribe an audio file with audio segments 115*a-e*. Based on an initial analysis of the audio features of each segment, the routing path as determined by the engine prediction neural network of SRC 105 for audio segments 115*a-e* is 2-3-1-4-4. In other words, segment 115*a* is routed to engine 2, segment 115*b* is routed to engine 3, and segment 1115*c* is routed to engine 1, etc. Transcription result 205 is a combination of transcription outputs from each engine of routing path 2-3-1-4-4 for segments 115*a-e*. Transcription result 205, as shown in FIG. 2, is "Jared golf threw a beautiful pass to Brandan Cook." In some embodiments, each of the engines 1-4 can provide a confidence of accuracy for the transcribed portion associated with each audio segment. Spelling wise, transcription result 205 appears to be fine. However, the confidence of accuracy values for audio segments 115*a*, 115*d*, and 115*e* can be low. In some embodiments, due to the low confidence of accuracy value for audio segments 115*a*, 115*d*, and 115*e*, SRC 105 can analyze other type of data associated with each segment to determine which type of specialized engine to use for subsequent round of transcription. The other type of data can be image data, metadata, or transcription data of audio segments occurring before and/or after (e.g., ±5 minutes) the segment with low confidence of accuracy.

FIG. 2 graphically illustrates engine 210 (engine 2) as the low confidence of accuracy engine that outputs the transcribed portion "golf" Similarly, engine 215 is another low confidence of accuracy engine that outputs the transcribed portion "Brandan Cook."

A human user can also be used to identify transcribed portions that need to be revaluated. In the above example, a human user can flag, using a graphical user interface (GUI), the transcribed portion "golf" as a candidate for reevaluation. The audio segment corresponding to the flagged transcribed portion would also be flagged for re-transcription. In this case, it would be the "golf" audio segment. Prior to selecting another transcription engine, SRC 105 can analyze other type of data associated with the "golf" audio segment such as one or more images having a timestamp spanning a certain time duration before and after the "golf" audio segment occurring within the media file. The other type of data can also be associated metadata or associated transcription data (transcribed portions) before and after the "golf" audio segment. For example, the associated transcribed portions for the "golf" audio segment can be "Two seconds on the play clock, he threw the ball. Wow. Jared golf threw a beautiful pass to Brandan Cook. Touchdown!" SRC 105 can send the above associated transcribed portions to a topic classification engine to determine the topic associated with the audio segments. In this example, SRC 105 can determine that the topic is football or sports using topical classification engine (not shown). Based on this classification result, SRC 105 can orchestrate only sports or football engines (such as engine 220) to re-transcribe the "golf" audio segment. Engine 220 can be a specialized sports engine and can correctly transcribe the "golf" audio segment as "Goff." In another example, SRC 105 can perform objection recognition of one or more images associated with the "golf" audio segment. As shown in FIG. 2, the associated image can be image 205, which shows that player 16 is about to throw a ball. Using an image classification engine, SRC 1105 can determine that player is 16 "Jared Goff" by jersey number and/or by facial recognition. This information can be fed back to the transcription correction module to correct the transcription to "Goff" from "golf". In some embodiments, the transcription correction module can compare confidence of accuracy values of one or more tags of image 205 with the confidence of accuracy of the transcribed portion "golf." If the tag for "Goff" has a higher confidence of accuracy value, the correction loop can replace the transcribed portion "golf" with the tag data "Goff." The transcription correction module can also use the tag information to determine the topic, subject, and/or context to help SRC 105 select a better set of engines to orchestrate. In this case, the better set of engines can be sports engines.

Similarly, classification result(s) of image 225 can be used to improve transcription results of audio segments 115*d* and 115*e*. In this example, the transcribed portions "Brandan Cook" can be corrected, by the correction loop, to "Brandin Cooks" based on image recognition results from engine 230, which can recognize the player as Brandin Cooks based on one or more of the jersey number, uniform color or patterns, and/or facial recognition. The transcription correction module can be a module within SRC 105. In some embodiments, transcription correction module can display two or more of the original transcribed portion (Brandon Cook), the classification results of the associated image 225, and an alternative transcription on a GUI. The transcription correction module can request a human user to select or confirm the alternative transcription.

Audio features of each segment can be extracted using data preprocessing methods such as cepstral analysis to extract dominant mel-frequency cepstral coefficients (MFCC) or using outputs of one or more layers of a neural network trained to perform speech recognition (e.g., speech to text classification). In this way, the labor-intensive process of features engineering for each audio segment can be automatically performed using a neural network such as a speech recognition neural network, which can be a deep neural network (e.g., a recurrent neural network), a convolutional neural network, a hybrid deep neural network (e.g., deep neural network hidden Markov model (DNN-HMM)), etc. The smart router conductor can be configured to use outputs of one or more hidden layers of the speech recognition neural network to extract relevant (e.g., dominant) features of the audio file. In some embodiments, the smart router conductor can be configured to use outputs of one or more layers of a deep speech neural network, by Mozilla Research, which has five hidden layers. In this embodiment, outputs of one or more hidden layers of the deep speech neural network can be used as inputs of an engine prediction neural network. For example, outputs from the last hidden layer of a deep neural network (e.g., Deep Speech) can be used as inputs of an engine prediction neural network, which can be a fully-layered convolutional neural network. In another example, outputs from the first and last hidden layers of a deep neural network can be used as inputs of an engine prediction neural network. In essence, the smart router conductor creates a hybrid deep neural network comprising of layers from a RNN at the frontend and a fully-layered CNN at the backend. The backend fully-layered CNN is trained to predict a best-candidate transcription engine given a set of outputs of one or more layers of the frontend RNN.

In some embodiments, the engine prediction neural network is configured to predict one or more best-candidate engines (engines with the best predicted results) based at least on the audio features of an audio spectrogram of the segment. For example, the engine prediction neural network is configured to predict one or more best-candidate engines based at least on outputs of one or more layers of a deep neural network trained to perform speech recognition. The outputs of one or more layers of a speech recognition deep neural network are representative of dominant audio features of a media (e.g., audio) segment.

The engine prediction neural network can be trained to predict the best-candidate engine by associating dominant features (e.g., weights of a layer) of an audio segment to an accuracy rating (e.g., word error rate) of an engine. The engine prediction neural network can be trained using training data set that includes hundreds or thousands of hours of audio and respective ground truth data, which is used to generate the word error rate (WER) of an engine for a segment. In this way, the engine prediction neural network can associate a certain set of dominant audio features to characteristics of one or more engines, which will be selected to transcribe the audio segment having that certain set of dominant audio features. In some embodiments, the engine prediction neural network is the last layer of a hybrid deep neural network, which consists of one or more layers from a deep neural network and one or more layers of the engine prediction neural network.

In some embodiments, audio features of an audio can be automatically extracted by one or more hidden layers of a deep neural network such as a deep speech neural network. The extracted audio features can then be used as inputs of an engine prediction neural network that is configured to determine the relationship(s) between the word error rate (WER) and the audio features of each audio segment. During the training stage, outputs from one or more layers of the deep neural network can be used to train the engine prediction neural network. In the production stage, outputs from one or more layers of the deep neural network can be used as inputs to the pre-trained engine prediction neural network to generate a list of one or more transcription engines having the lowest WER. In some embodiments, the engine prediction neural network can be a CNN trained to predict the WER of an engine based at least on audio features of an audio segment and/or on the engine's characteristics. In some embodiments, the engine prediction neural network is configured to determine the relationship between the WER of an engine and the audio features of a segment using statistical method such as regression analysis, correlation analysis, etc. The WER can be calculated based at least on the comparison of the engine outputs with the ground truth transcription data. It should be noted that low WER means higher accuracy.

Once the engine prediction neural network is trained to learn the relationship between one or more of the WER of an engine, characteristics of an engine, and the audio features of an audio segment (having a certain audio features), the smart router conductor can orchestrate the collection of engines in the conductor ecosystem to transcribe the plurality of segments of the audio file based on the raw audio features of each audio segment. For example, the smart router conductor can select which engine (in the ecosystem of engines) to transcribe which segment (of the plurality of segments) of the audio file based at least on the audio features of the segment and the predicted WER of the engine associated with that segment. For instance, the smart router conductor can select engine "A" having a low predicted (or lowest among engines in the ecosystem) WER for a first set of dominant cepstral features of a first segment of an audio file, which is determined based at least on association(s) between the first set of dominant cepstral features and certain characteristics of engine "A." Similarly, the smart router conductor can also select engine "B" having a low predicted WER for another set of dominant cepstral features for a second segment of the audio file. Each set of dominant cepstral features can have one or more cepstral features. In another example, the smart router conductor can select engine "C" based at least on a set of dominant cepstral features that is associated with an audio segment with a speaker having a certain dialect. In this example, the "C" engine can have the lowest predicted WER value (as compared with other engines in the ecosystem) associated with the set of cepstral features that is dominant with that dialect. In another example, the smart router conductor can select engine "D" based at least on a set of dominant cepstral features that is associated with: (a) an audio segment having a noisy background, and (b) certain characteristics of engine "D."

For orchestrating image or object recognition, image features can be extracted from one or more layers of an image classification neural network such as, but not limited to, a VGG convolutional neural network. Weights from the one or more layers of the VGG neural network represent dominant (e.g., relevant) features of the image. In some embodiments, outputs from one or more layers can be used as inputs for training an engine prediction neural network. For example, outputs of the last hidden layer of a VGG neural network can be used to train, using ground truth images, an engine prediction neural network. In another example, outputs from the first and last hidden layers of a VGG neural network can be used to train an engine prediction neural network. In the training stage, the engine prediction neural network is trained to associate image features (extracted from one or more layers of an image classification neural network) with an image classification engine's classification performance of a ground truth image. After the engine prediction neural network is trained with hundreds or thousands of ground truth images and their classification results from several engines in the conductor ecosystem, the engine prediction neural network will be able to predict how each image classification engine used in the training process would perform given a set of image features.

As previously mentioned, the engine prediction neural network of SRC 105 can be many different entities. It can be a neural network trained to predict the best transcription engine based on audio features of an audio file or it can be a neural network trained to predict the best image recognition engine based on image features of an image. When SRC 105 performs neural network orchestration, it can select an appropriate engine prediction neural network based on at least on the type of classification task to be performed and/or the type of data being classified. For example, for a facial classification task, SRC 105 can select an engine prediction neural network trained to generate a list of best candidate facial classification engines. For a transcription task, SRC 105 can select an engine prediction neural network trained predict the best transcription engine.

Preemptive Orchestration

Figure 3A:
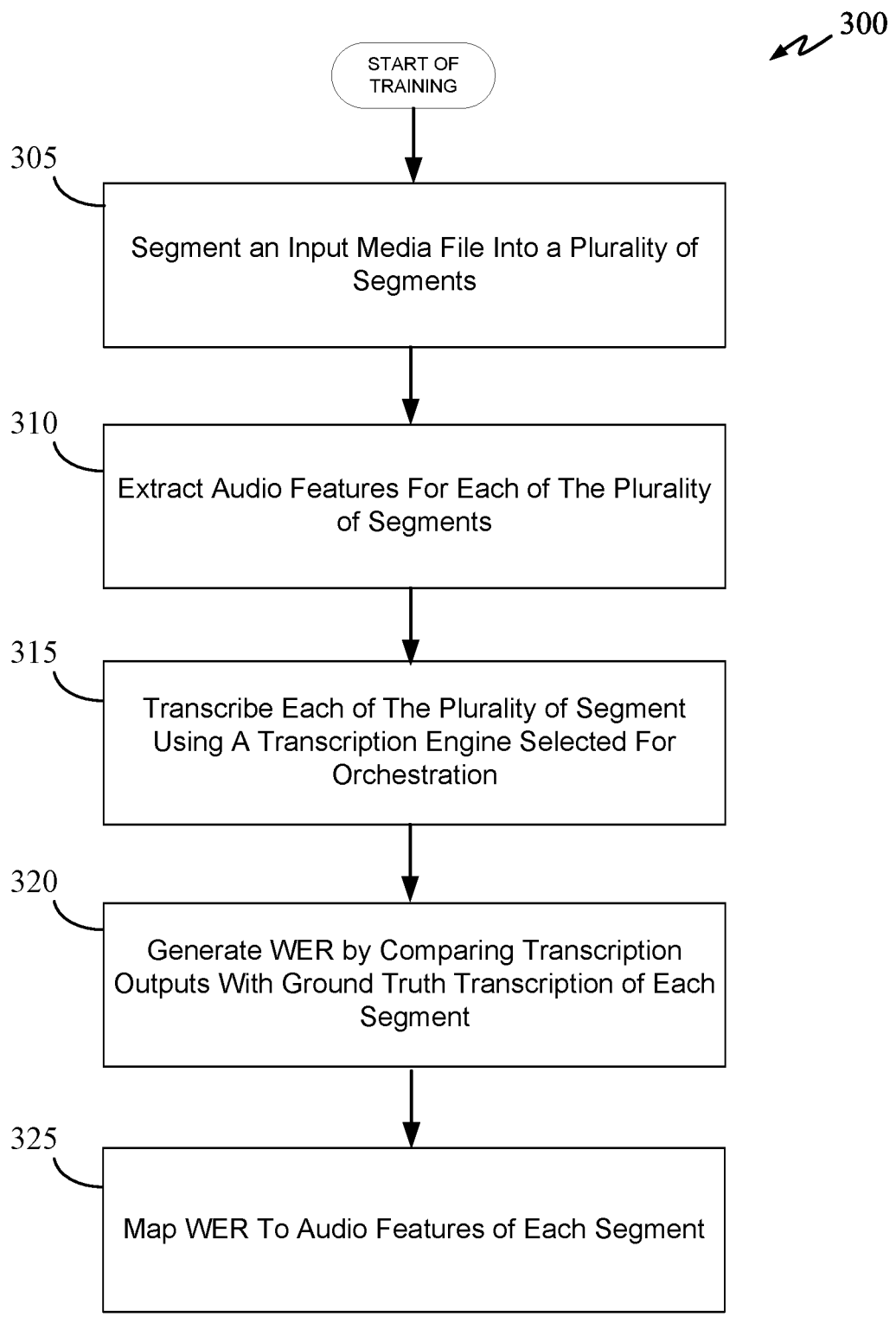
FIGS. 3A and 3B are flow diagrams of training processes in accordance with some aspects of the disclosure.

FIG. 3A illustrates a training process 300 for training an engine prediction neural network to preemptively orchestrate (e.g., pairing) a plurality of media segments with corresponding best transcription engines based at least on extracted audio features of each segment in accordance with some embodiments of the present disclosure. The engine prediction neural network can be a backend of hybrid deep neural network (see FIG. 5) having a frontend and backend neural networks, which can have the same or different neural network architectures. The frontend neural network of the hybrid deep neural network can be a pre-trained speech recognition neural network. In some embodiments, the backend neural network makes up the engine prediction neural network, which is trained by process 300 to predict an engine's WER based at least on audio features of an audio segment. The engine prediction neural network (e.g., backend neural network of the hybrid deep neural network) can be a neural network such as, but not limited to, a deep neural network (e.g., RNN), a feedforward neural network, a convolutional neural network (CNN), a faster R-CNN, a mask R-CNN, a SSD neural network, a hybrid neural network, etc.

Process 300 starts 305 where the input media file of a training data set is segmented into a plurality of segments. The input media file can be an audio file, a video file, or a multimedia file. In some embodiments, the input media file is an audio file. The input media file can be segmented into a plurality of segments by time duration. For example, the input media file can be segmented into a plurality of 5-second or 10-second segments. Each segment can be preprocessed and transformed into an appropriate format for use as inputs of a neural network. For example, an audio segment can be preprocessed and transformed into a multidimensional array or tensor. Once the media segment is preprocessed and transformed into the appropriate data format (e.g., tensor), the preprocessed media segment can be used as inputs to a neural network.

At 310, the audio features of each segment of the plurality of segments are extracted. This can be done using data preprocessors such as cepstral analyzer to extract dominant mel-frequency cepstral coefficients. Typically, further features engineering and analysis are required to appropriately identify dominant mel-frequency cepstral coefficients.

In some embodiments, subprocess 310 can use a pretrained speech recognition neural network to identify dominant audio features of an audio segment. Dominant audio features of the media segment can be extracted from the outputs (e.g., weights) of one or more nodes of the pretrained speech recognition neural network. Dominant audio features of the media segment can also be extracted from the outputs of one or more layers of the pre-trained speech recognition neural network. Outputs of one or more hidden nodes and/or layers can be representative of dominant audio features of an audio spectrogram. Accordingly, using outputs of layer(s) of the pre-trained speech recognition neural network eliminates the need to perform additional features engineering and statistical analysis (e.g., hot encoding, etc.) to identify dominant features.

In some embodiments, subprocess 310 can use outputs of one or more hidden layers of a recurrent neural network (trained to perform speech to text classification) to identify dominant audio features of each segment. For example, a recurrent neural network such as the deep speech neural network by Mozilla can be modified by removing the last character prediction layer and replacing it with an engine prediction layer, which can be a separate, different, and fully layered neural network. Inputs that were meant for the character prediction layer of the RNN is then used as inputs for the new engine prediction layer or neural network. In other words, outputs of one or more hidden layers of the RNN are used as inputs to the new engine prediction neural network. The engine prediction layer, which will be further discussed in detail below, can be a regression-based neural network that predicts relationships between the WER of an engine and the audio features (e.g., outputs of one or more layers of the RNN) of each segment.

At 315, each engine to be orchestrated in the engine ecosystem can transcribe the entire input media file used at subprocesses 305 and 310. Each engine can transcribe the input media file by segments. The transcription results of each segment will be compared with the ground truth transcription data of each respective segment at 320 to generate a WER of the engine for the segment. For example, to train the engine prediction neural network to predict the WER of an engine for an audio segment, the engine must be used in the training process, which can involve transcribing a training data set with ground truth data. The transcription results from the engine will then be compared with the ground truth data to generate the WER for the engine for each audio segment, which can be seconds in length. Each engine can have many WERs, one WER for each segment of the audio file.

Each media file of the training data set used to train the engine prediction neural network includes an audio file and the ground truth transcription of the audio file. To train the engine prediction neural network to perform engine prediction for objection recognition, each media file of the training data set can include a video portion and ground truth metadata of the video. The ground truth metadata of the video can include identifying information that identifies and describes one or more objects in the video frame. For example, the identifying information of an object can include hierarchical class data and one or more subclass data. A class data can include information such as, but not limited to, whether the object is an animal, a man-made object, a plant, etc. Subclass data can include information such as, but not limited to, the type of animal, gender, color, size, etc.

In some embodiments, the audio file and the ground truth transcript can be processed by a speech-to-text analyzer to generate timing information for each word. For example, the speech-to-text analyzer can ingest both the ground truth transcript and the audio data as inputs to generate timing information for the ground truth transcription. In this way, each segment can include spoken word data and the timing of each spoken word. This enables the engine prediction neural network to be trained to make associations between the spoken word of each segment and corresponding audio features of the segment of the media file.

At 325, the engine prediction neural network is trained to map the engine calculated WER of each segment to audio features of each segment. In some embodiments, the engine prediction neural network can use a regression analysis to learn the relationship(s) between the engine WER and the audio features of each segment. For example, the engine prediction neural network can use a regression analysis to learn the relationship(s) between the engine WER for each segment and the outputs of one or more hidden layers from a deep neural network trained to perform speech recognition. Once trained, the engine prediction neural network can predict the WER of a given engine based at least on the audio features of an audio segment. Inherently, the engine prediction neural network can also learn the association between an engine WER and various engine characteristics and dominant audio features of the segment.

In some embodiments, the backend neural network can be one or more layers of the deep speech neural network by Mozilla Research. In this embodiment, the deep speech neural network is configured to analyze an audio file in time steps of 20 milliseconds. Each time step can have 2048 features. The 2048 features of each time step can be used as inputs for a new fully-connected layer that has a number of outputs equal to the number of engines being orchestrated. Since a time step of 20 milliseconds is too fine for predicting the WER of a 5-second duration segment, the mean over many time steps can be calculated. Accordingly, the engine prediction layer of the deep speech neural network (e.g., RNN) can be trained based at least on the mean squared error with respect to known WER (WER based on ground truth data) for each audio segment.

In some embodiments, engine prediction neural network can be a CNN, which can have filters that combine inputs from several neighboring time steps into each output. These filters are then scanned across the input time domain to generate outputs that are more contextual than outputs of a RNN. In other words, the outputs of a CNN filter of a segment are more dependent on the audio features of neighboring segments. In a CNN, the number of parameters is the number of input channels times the number of output channels times the filter size. A fully connected layer that operates independently on each time step is equivalent to a CNN with a filter size of one and thus the number of parameters can be the number of input channels times the number of output channels. However, to reduce the number of parameters, neighboring features can be combined with pooling layers to reduce the dimension the CNN.

In some embodiments, neighboring points of a CNN layer can be combined by using pooling methods. The pooling method used by process 300 can be an average pooling operation as empirical data show that it performs better than a max pooling operation for transcription purposes.

It should be noted that one or more subprocesses of process 300 can be performed interchangeably. In other words, one or more subprocesses such as subprocesses 305, 310, 315, and 320 can be performed in different orders or in parallel. For example, subprocesses 315 and 320 can be performed prior to subprocesses 305 and 310.

Figure 3B:
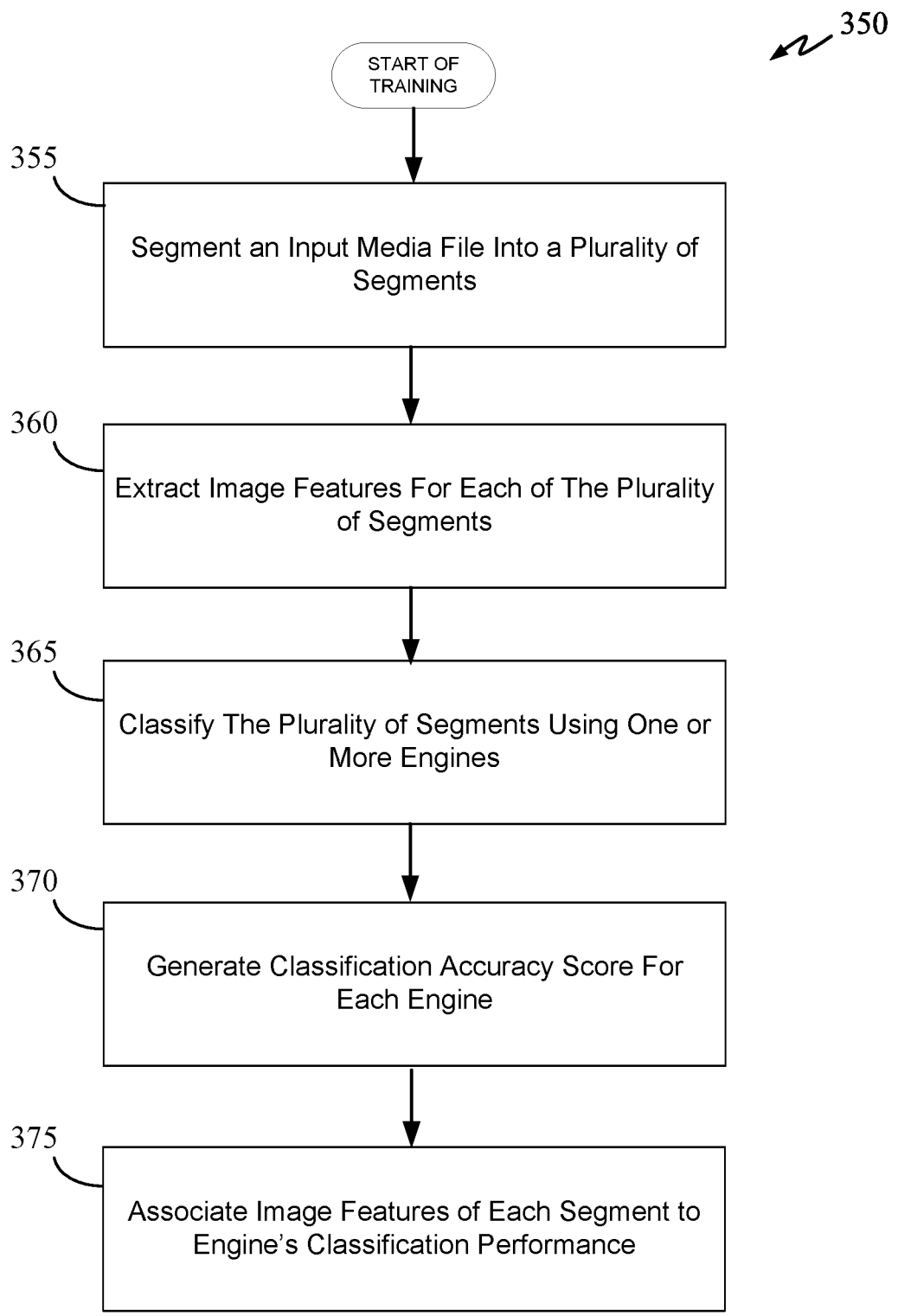

FIG. 3B illustrates a process 350 for training an engine prediction neural network to associate image features of an image with the classification performance (e.g., classification accuracy score) of an image classification engine in accordance with some embodiments of the present disclosure. As previously described, the engine prediction neural network can be a backend of hybrid deep neural network (see FIG. 5) having a frontend and backend neural networks. The frontend neural network of the hybrid deep neural network can be a pre-trained image classification (e.g., image or object recognition) neural network. The backend neural network (e.g., the engine prediction neural network) can be a deep neural network (e.g., RNN), a feedforward neural network, a convolutional neural network (CNN), a faster R-CNN, a mask R-CNN, a SSD neural network, a hybrid neural network, etc. Outputs of the frontend image classification neural network can be used as inputs to the backend neural network to generate a list of engines with a predicted classification accuracy.

Process 350 starts at 355 where an input media file (e.g., a multimedia file, an image file) is segmented into a plurality of segments. The input media file can be an image file. In some embodiments, the image file is not segmented. The plurality of segments of an image file can be portions of the image at various locations of the image (e.g., middle portion, upper-left corner portion, upper-right corner portion). At 360, the image features of the image or the plurality of segments of the image are extracted. In some embodiments, this can be accomplished by analyzing each segment using an image classification engine such as, but not limited to, a VGG image neural network and then extracting the outputs (e.g., weights) of one or more layers of the image classification engine. For example, the outputs of the last hidden layer of the image classification engine can be used to represent the dominant image features of each segment. In another example, the outputs of the second and last hidden layers of the image classification engine can be combined and use to represent the dominant image features of each segment (or the entire image).

At 365, each engine to be orchestrated by SRC 105 in the ecosystem of engines is tasked to classify the one or more segments of the image. At 370, the classification results from each engine for each segment are scored to generate a classification accuracy score for each segment and engine. For example, given 4 image segments, each engine will have 4 different classification accuracy score—one for each segment.

At 375, the engine prediction neural network (e.g., backend neural network) of SRC 105 is trained to associate the image features of each image segment with the classification accuracy score of each engine for that particular image segment. The classification accuracy score of each engine for a segment can be obtained by comparing the classification results of the segment with the ground truth data of the segment.

Figure 4:
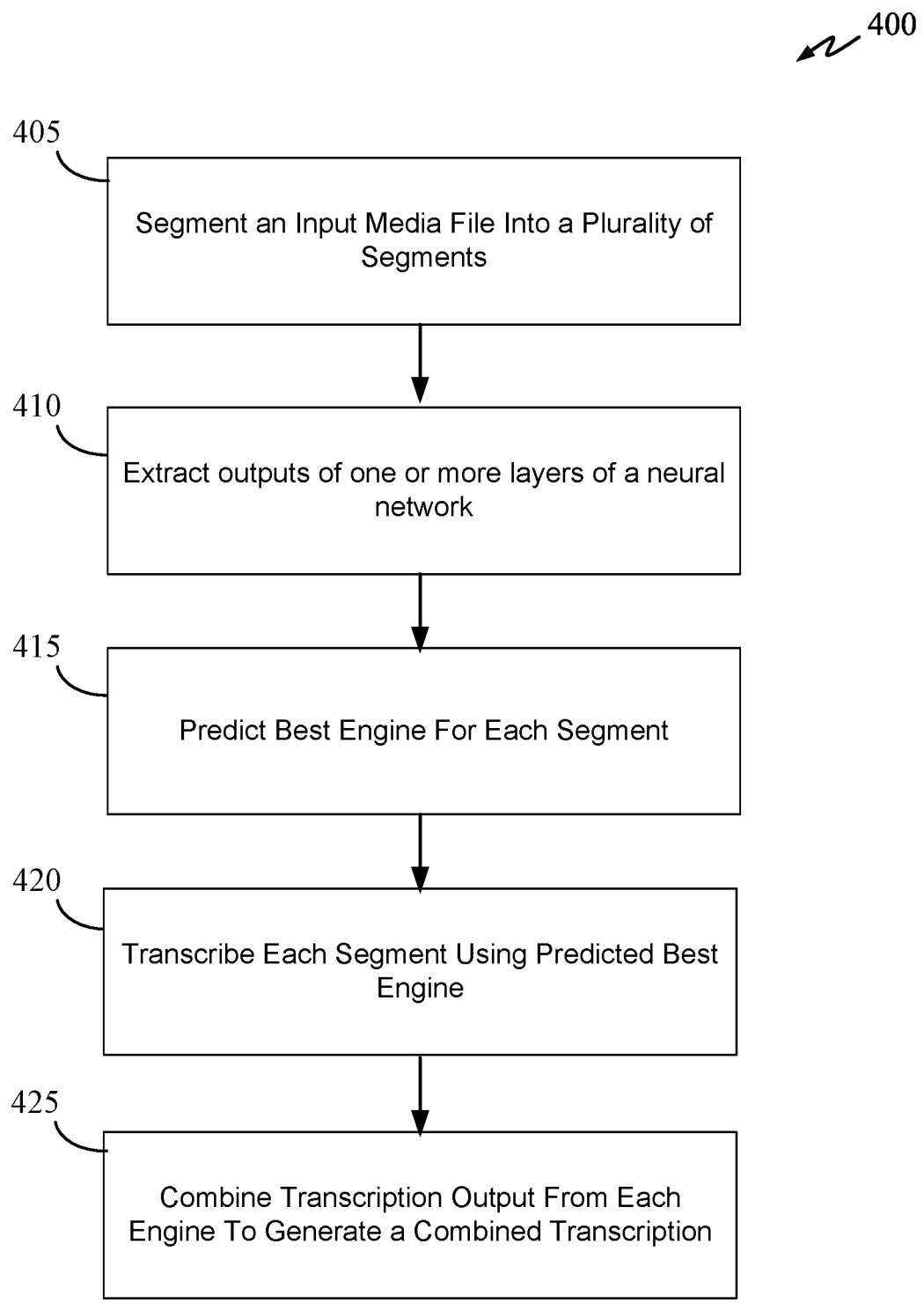
FIG. 4 is a flow diagram of a transcription process in accordance with an aspect of the disclosure.

FIG. 4 illustrates a process 400 for transcribing an input media file using a hybrid neural network that can preemptive orchestrate a group of engines of an engine ecosystem in accordance with some embodiments of the present invention. Process 400 starts at 405 where the input media file is segmented into a plurality of segments. The media file can be segmented based on a time duration (segments with a fixed time duration), audio features, topic, scene, and/or metadata of the input media file. The input media file can also be segmented using a combination of the above variables (e.g., duration, topic, scene, etc.).

In some embodiments, the media file (e.g., audio file, video file) can be segmented by duration of 2-10 seconds. For example, the audio file can be segmented into a plurality segments having an approximate duration of 5 seconds.

Further, the input media file can be segmented by duration and only at locations where no speech is detected. In this way, the input media file is not segmented such that a word sound is broken between two segments.

The input media file can also be segmented based on two or more variables such as topic and duration, scene and duration, metadata and duration, etc. For example, subprocess 105 can use a segmentation module (see item 8515 of FIG. 8) to segment the input media file by scenes and then by duration to yield 5-second segments of various scenes. In another example, process 400 can segment by a duration of 10-second segments and then further segment each 10-second segment by certain dominant audio feature(s) or scene (s). In some embodiments, the scene of various segments of the input media file can be identified using metadata of the input media file or using a neural network trained to identify scenes, using metadata and/or images, from the input media file. Each segment can be preprocessed and transformed into an appropriate format for use as inputs of a neural network When the input media file is an image, the image can be segmented into a plurality of image portions (e.g., a facial portion, an object portion).

Starting at subprocess 410, a neural network (e.g., DNN, hybrid deep neural network) can be used to extract audio features of the plurality of segments and to preemptively orchestrate (e.g., pairing) the plurality of segments with corresponding best transcription engines based at least on the extracted audio features of each segment. In some embodiments, a hybrid deep neural network can be used, which can include two or more neural networks of different architectures (e.g., RNN, CNN). In some embodiments, the hybrid deep neural network can include a RNN frontend and a CNN backend. The RNN frontend can be trained to ingest speech spectrograms and generate text (speech-to-text classification). However, the goal is not to generate a text associated with the ingested speech spectrograms. Here, only outputs of one or more hidden layers of the RNN frontend are of interest. The outputs of the one or more hidden layers represent dominant audio features of the media segment that have been automatically generated by the layers of the RNN frontend. In this way, audio features for the media segment do not have to be manually engineered. In some embodiments, outputs from a plurality of layers are used as inputs of an engine prediction neural network at 415. For example, outputs from the first and the penultimate hidden layers can be used as inputs of an engine prediction neural network. In another example, outputs from the first and last hidden layers can be used as inputs to an engine prediction neural network. In yet another example, outputs from the second and last hidden layers can be used as inputs an engine prediction neural network. Additionally, outputs only from the last hidden layer can be used.

For an image or object classification (e.g., object identification and recognition) task, an image classification neural network is used to extract image features of the image. This can be done by extracting outputs of one or more hidden layers of the image classification neural network. Similar to the transcription case, any combination of outputs from two or more hidden layers can be used as inputs to the engine prediction neural network. Additionally, outputs only from the last hidden layer of the image classification neural network can be used as inputs to the engine prediction neural network.

At 415, the CNN backend can be an engine prediction neural network trained to identify a list of best-candidate engines for transcribing each segment based on at least audio features (e.g., outputs of RNN frontend) of the segment and the predicted WER of each engine for the segment. The list of best-candidate engines can have one or more engines identified for each segment. A best-candidate engine is an engine that is predicted to provide results having a certain level of accuracy (e.g., WER of 15% or less). A best-candidate engine can also be an engine that is predicted to provide the most accurate results compared to other engines in the ecosystem. When the list of best-candidate engines has two or more engines, the engines can be ranked by accuracy. In some embodiments, each engine can have multiple WERs. Each WER of an engine is associated with one set of audio features of a segment of the audio file.

The trained engine prediction neural network is trained to predict an engine WER based at least on the engine characteristics and the raw audio features of an audio segment. In the training process, the engine prediction neural network is trained using training data set with ground truth data and WERs of segments of audio calculated based on the ground truth data. Ground truth data can include verified transcription data (e.g., 100% accurate, human verified transcription data) and other metadata such as scenes, topics, etc. In some embodiments, the engine prediction neural network can be trained using an objective function with engine characteristics (e.g., hyperparameters, weights of nodes) as variables.

At 420, each segment of the plurality of segments is transcribed by the predicted best-candidate engine. Once the best-candidate engine is identified for a segment, the segment can be made accessible to the best-candidate engine for transcription. Where more than one best-candidate engines are identified, the segment can be made available to both engines. The engine that returns a transcription output with the highest value of confidence will be used as the final transcription for that segment.

At 425, transcription outputs from the best-candidate engines sourced at 115 are combined to generate a combined transcription result.

Features extraction is a process that is performed during both the training stage and the production stage. In training stage, as in process 100, features extraction is performed at 110 where the audio features of the input media file are extracted by extracting outputs of one or more layers of a neural network trained to ingest audio and generate text. The audio features extraction process can be performed on a segment of an audio file or on the entire input file (and then segmented into portions). In the production stage, features extraction is performed on an audio segment to be transcribed so that the engine prediction neural network can use the extracted audio features to predict the WER of one or more engines in the engine ecosystem (for the audio segment). In this way, the engine with the highest predicted WER for an audio segment can be selected to transcribe the audio segment. This can save a significant amount of resources by eliminating the need to perform transcription using a trial and error or random approach to engine selection.

Figure 5:
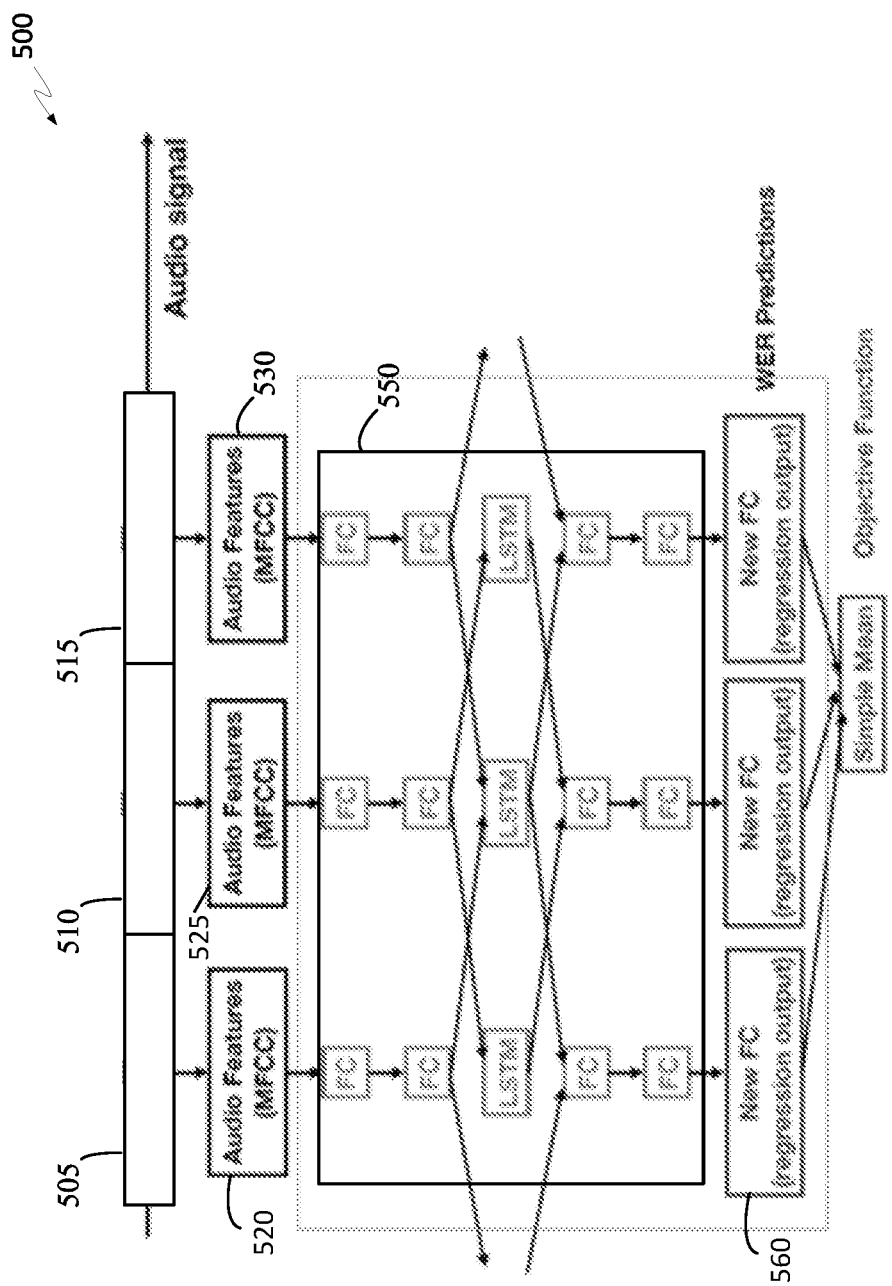
FIG. 5 is a diagram of a hybrid deep neural network in accordance with an aspect of the disclosure.

Feature extractions can be done using a deep speech neural network. Other types of neural network such as convolutional neural network (CNN) can also be used to ingest audio data and extract dominant audio features of the audio data. FIG. 5 graphically illustrates a hybrid deep neural network 500 used to extract audio features and to preemptively orchestrate audio segments to best candidate transcription engines in accordance with some embodiments of the present disclosure. In some embodiments, hybrid deep neural network 500 includes an RNN frontend 550 and a CNN backend 560. RNN frontend 550 can be a pre-trained speech recognition network, and CNN backend 560 can be an engine prediction neural network trained to predict the WERs of one or more engines in the engine ecosystem based at least on outputs from RNN frontend 550.

As shown, an audio signal can be segmented into small time segments 505, 510, and 515. Each of segments 505, 510, and 515 has its respective audio features 520, 525, and 530. However, at this stage in process 210, audio features of each segment are just audio spectrograms and the dominant features of the spectrograms are not yet known.

To extract the dominant audio features of each segment, the audio features are used as inputs to layers of frontend neural network 550, which will automatically identify dominant features through its network of hidden nodes/layers and weights associated with each node. In some embodiments, neural network 550 can be a recurrent neural network with long short-term memory (LSTM) units, which can be composed of a cell, an input gate, an output gate and a forget gate. The cell of a LSTM unit can remember values over arbitrary time intervals and the three gates regulate the flow of information into and out of the cell. LSTM networks are well-suited for classifying, processing and making predictions based on time series data, since there can be lags of unknown duration between important events in a time series.

In some embodiments, neural network 550 can be a recurrent neural network with five hidden layers. The five hidden layers can be configured to encode phoneme(s) of the audio input file or phoneme(s) of a waveform across one or more of the five layers. The LSTM units are designed to remember values of one or more layers over a period of time such that one or more audio features of the input media file can be mapped to the entire phoneme, which can spread over multiple layers and/or multiple segments. The outputs of the fifth layer of the RNN are then used as inputs to engine-prediction layer 560, which can be a regression-based analyzer configured to learn the relationship between the dominant audio features of the segment and the WER of the engine for that segment (which was established at 120).

In some embodiments, the WER of a segment can be an average WER of a plurality of subsegments. For example, a segment can be 5 seconds in duration, and the WER for the 5-second segment can be an average of WERs for a plurality of 1-second segments. The WER of a segment can be a truncated average or a modified average of a plurality of subsegment WERs.

In a conventional recurrent neural network, the sixth or last layer maps the encoded phoneme(s) to a character, which is then provided as input to a language model to generate a transcription. However, in process 500, the last layer of the conventional recurrent neural network is replaced with engine-prediction layer 560, which is configured to map encoded phonemes (e.g., dominant audio features) to a WER of an engine for a segment. For example, engine-prediction layer 560 can map audio features 520 of segment 505 to a transcription engine by Nuance with a low WER score.

In some embodiments, during the training process, each engine that is to be orchestrated must be trained using training data with ground truth transcription data. In this way, the WER can be calculated based on the comparison of the engine outputs with the ground truth transcription data. Once a collection of engines is trained using the training data set to obtain the WER for each engine for each audio segment (having a certain audio features), the trained collection of engines can be orchestrated such that subprocess 215 (for example) can select one or more of the orchestrated engines (engines in the ecosystem that have been used to train engine prediction neural network) that can best transcribe a given media segment.

Figure 6:
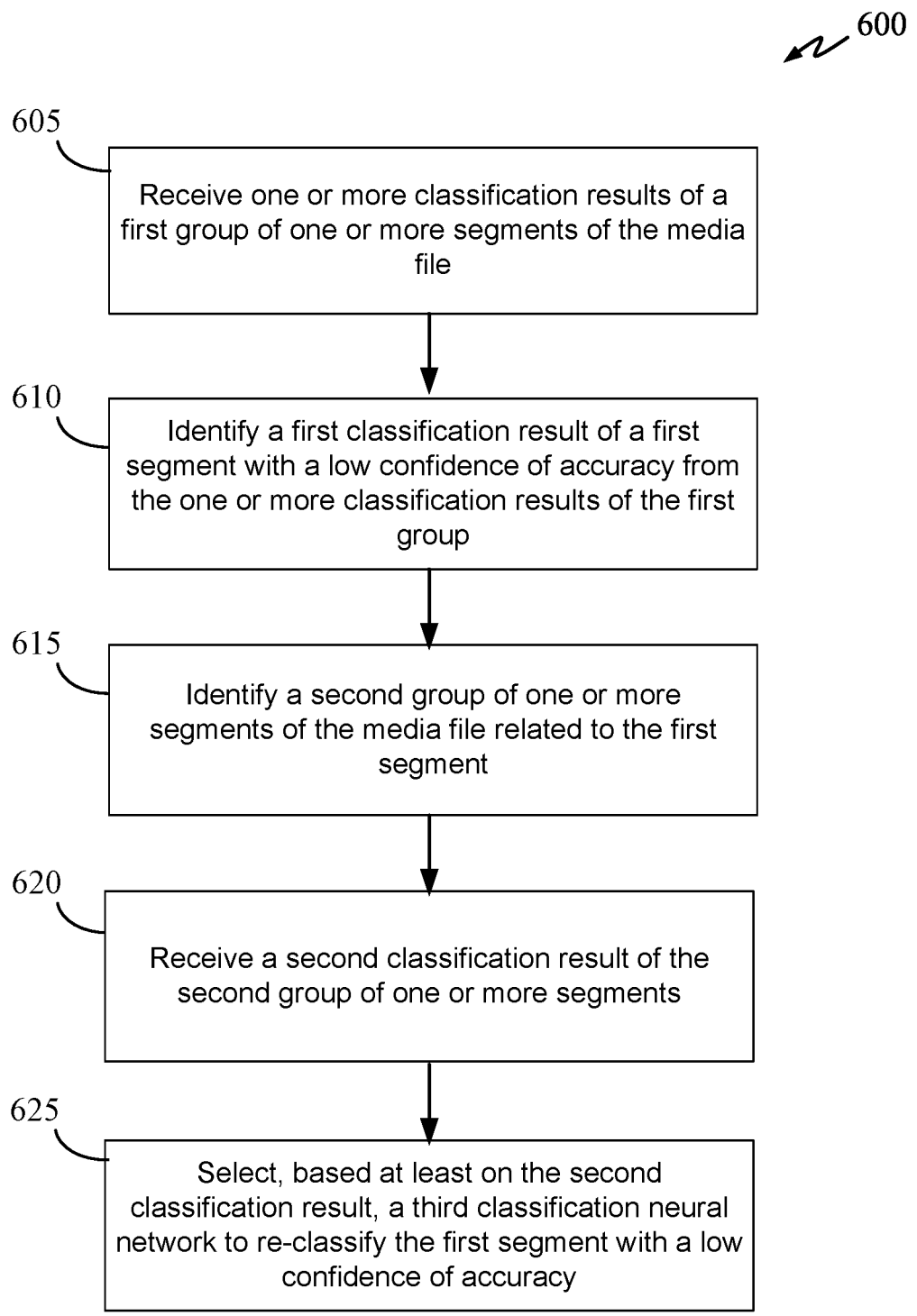
FIG. 6 is a flow diagram of a classification process in accordance with an aspect of the disclosure.

FIG. 6 illustrates a process 600 for performing engines orchestration between different classes (e.g., interclass) of data. Process 600 starts at subprocess 605 where one or more classification results of a first group of one or more segments are received from a first classification engine. The one or more classification results can be, but not limited to, transcription results, image classification (e.g., tagging) results, or object classification results. A first group of one or more segments can have one segment or many segments. For example, at 605, a transcription engine can output transcription results of a first group of segments having ten audio segments. In another example, an object classification engine can output object recognition results of objects at several portions of an image. In other words, objects at multiple portions of the image can be recognized (e.g., classified) by the object classification engine.

The first classification engine can be a transcription engine, an object or image recognition engine, a color classification engine, an animal classification engine, a facial classification, etc. The first group of segments can be audio segments, portions of an images, portions of a larger transcripts, or portions of a metadata. For example, if the first classification engine is a transcription engine, then the first group of segments can be segments of an audio file. In another example, if the first classification engine is an object recognition engine, then the first group of segments can be segments (e.g., portions) of an image or the entire image.

At subprocess 610, a classification result of a segment with a low confidence of accuracy is identified. In the previous subprocess 605, many classification results can be received. Each of the classification results can include a low confidence of accuracy value provided by the classification engine. At 610, any segment with a low confidence of accuracy value below a certain accuracy threshold (e.g., 50%) is identified. Accordingly, a low confidence segment is a segment having a low confidence of accuracy value below a certain accuracy threshold, which can be dynamically selected.

At subprocess 615, a second group of one or more segments associated (e.g., related) with the low confidence segment is identified. The second group of one or more segments can be a different class of data as the first group of one or more segment at subprocess 605. For example, if at 605, the first group of segments are segments of an audio file, then the second group of one or more segments can be any type of data other than audio data such as, but not limited to, image data, transcription data (text), or metadata. In one example, the second group of one or more segments can be one or more portions (e.g., different locations) of an image. Referring to FIG. 2, the first group of segments can be audio segments 115a-115e. The second group of segments can be one or more portions of image 205. A portion of image 205 can be an entire image, a box around the jersey number 16, or a box around the face of the player number 16. The second group of one or more segments can also be transcription or image data spanning a certain duration before and/or after timestamp of the low confidence segment. For example, the second group of one or more segments can be transcripts or video data 5 minutes before and after the timestamp of the low confidence segment.

At subprocess 620, a second classification result of the second group of one or more segments is received. In the above example using image 205, the second classification result can be recognition of the jersey number and/or the facial recognition of the player. In this example, the second classification can be jersey number 16 and the associated player name "Jared Goff."

At subprocess 625, a third classification neural network can be selected, based at least on the second classification result (from 620) to reclassify the segment with a low confidence of accuracy, which was identified at subprocess 610. In the above example, SRC 105 can use the second classification result that identifies jersey number 16 associated with "Jared Goff" or recognizes Jared Goffs face using facial recognition to select a transcription specialized in sports, pronouns, or football.

In another example of process 600 functionality, the one or more classification results received at 605 can be a facial recognition result of image 225 of FIG. 2. For example, the facial recognition result received from a facial recognition engine can be "Clint Eastwood." At 610, this result is identified to have a low confidence of accuracy—an accuracy value of 35%. At 615, a second group of one of one or more segments (of a multimedia file) relating to image 225 is identified. This can be audio data or metadata occurring contemporaneously with image 225 in the multimedia file. For example, the second group of one or more segments can be one or more of audio segments 115a-115e having timestamp generally around (e.g., 30 seconds before and after) the timestamp of image 225. At 620, one or more of the audio segments 115a-115e are transcribed (e.g., speech-to-text classification). At 625, based on the transcription results (even with errors), "Jared golf threw a beautiful pass to Brandon Cook," SRC 105 can determine, using a topic classification engine of the transcription results, that the topic is sports or football. SRC 150 can then select a facial recognition engine that is specialized in sports (e.g., trained with sports personalities).

Figure 7:
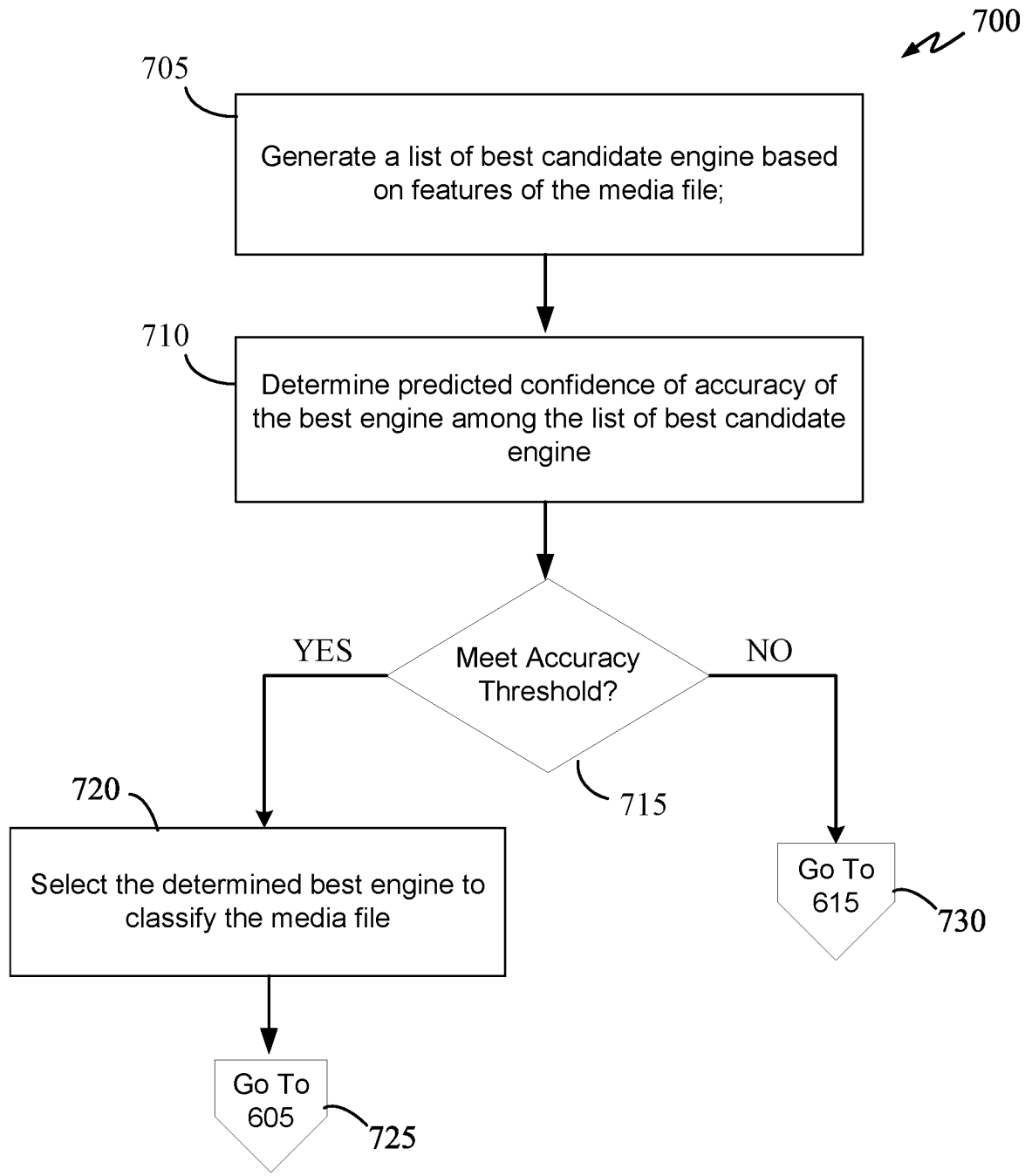
FIG. 7 is a flow diagram of a classification process in accordance with an aspect of the disclosure.

FIG. 7 illustrates a process 700 for orchestrating neural network based on interclass data of a media file in accordance with some embodiments of the present disclosure. Prior to subprocess 705, the input media file can be segmented into a plurality of segments similar to subprocess 405 of process 400. Next, the features of each segment can be extracted using outputs of one or more layers of a neural network, which is also similar to subprocess 410 of process 400. At subprocess 705, the features of the media file or segment of the media file would have already been extracted to use as input to predict the best candidate engine(s) based on features of the media file. The features of the media file depend on the data type of the media file being classified. If the media file is an audio file, then the features can be audio spectrogram of the audio file. If the media file is an image, then the features can be features as defined by outputs of one or more layers of an image classification neural network such as, but not limited to, a VGG image classifier. Accordingly, at subprocess 705, a list of best candidate engines is generated based on the features of the media file. In some embodiments, this can be accomplished using an engine prediction neural network of SRC 105 as previously discussed.

At subprocess 710, the predicted confidence of accuracy of the best engine among the list of best candidate engines is determined. For example, the list of best candidate engines can have two engines. The first engine can have a predicted accuracy of 25% and the second engine can have a predicted accuracy of 37%. In this example, the best engine is the second engine, with a 37% predicted accuracy.

At subprocess 715, a determination is made whether the best engine among the list of best candidate engines meets a predetermined accuracy threshold. For example, the accuracy threshold can be set at 65%. If the accuracy threshold is met, the best candidate engine is requested to classify the media file. It should be noted that the media file can be a segment or the entire media file. For example, if the media file is an audio segment, then the best candidate transcription engine is requested to transcribe the audio segment at 720. In another example, if the media file is an image, then best candidate image classification is requested to classify the image and/or objects within the image.

At 725, the outputs of the best candidate engine are received at subprocess 605 and interclass orchestration process continues through subprocess 625. In this way, in case the classification result from the best candidate engine does not have a sufficiently high confidence of accuracy value, the interclass orchestration process can select a more appropriate engine using process 600.

Back at 715, if the accuracy threshold is not met, the process proceeds (at 730) directly to subprocess 615 of process 600 and continues through subprocess 625. If the media file is an audio file, a second group of one or more segments relating to the audio file is identified. In this example, the second group of segments can be image 205 and/or image 225. The second group of segments can also be metadata contemporaneously to the audio segment or within a certain time span (e.g., 5 minutes before and after) of the timestamp of the audio segment. By skipping to subprocess 615 when the accuracy threshold is not met at 715, resources can be conserved by not requesting engine(s) with predicted low value of accuracy, identified prior to subprocess 605 (e.g., at subprocess 415 of process 400 where the candidate best engine is predicted for each segment), to classify the media file. Skipping to subprocess 615 (from subprocess 715) enables SRC 105 to perform interclass orchestration immediately after determining that none of the best candidate engines among the list of best candidate engines has a sufficiently high confidence of accuracy value. This saves both time and resources and enables SRC 105 to be more efficient.

Empirical Data

Figure 8:
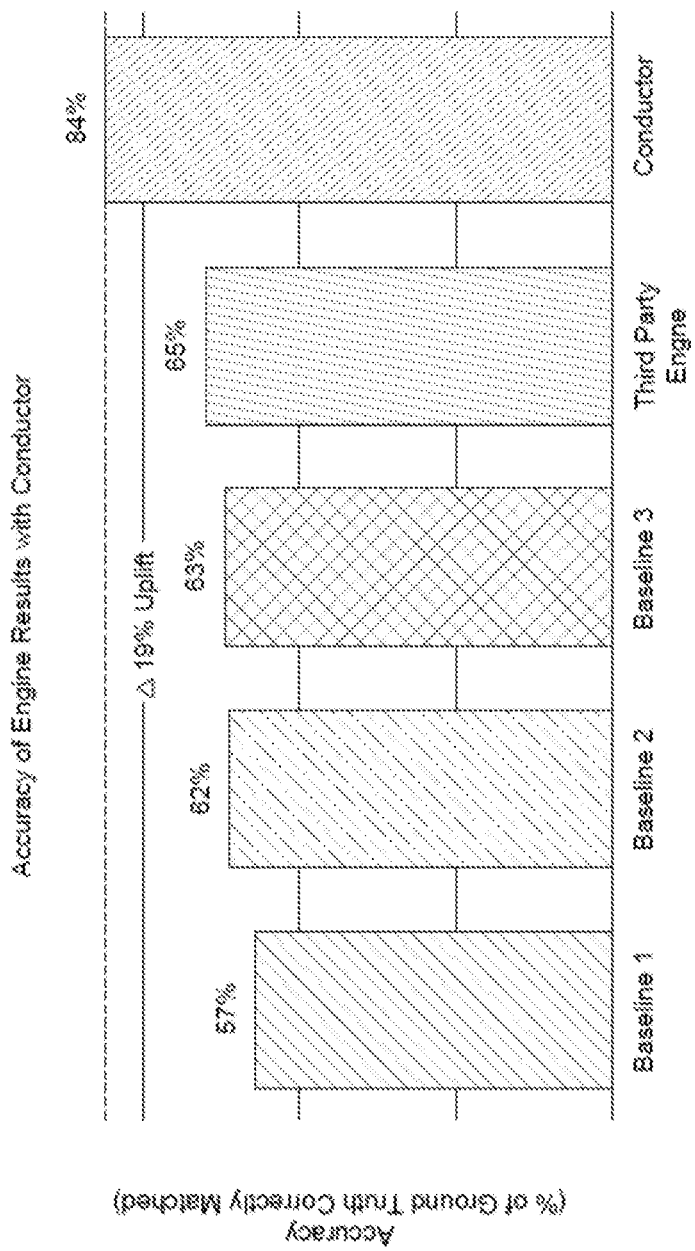
FIG. 8 is a chart illustrating the level of transcription accuracy improvement of the transcription process of FIGS. 1-2 over conventional transcription systems.

FIG. 8 is a bar chart illustrating the improvements for engines outputs using the smart router conductor with preemptive orchestration. As shown in FIG. 8, a typical baseline accuracy for any engine is 57% to 65% accuracy. However, using SRC 105, the accuracy of the resulting transcription can be dramatically improved. In one scenario, the improvement is 19% better than the next best transcription engine working alone.

Example Engine Prediction Neural Network Structure

As previously mentioned, the backend neural network used to orchestrate transcription engine (e.g., engine prediction based on audio features of a segment) can be, but not limited to, an RNN or a CNN. For a backend RNN, the average WER of multiple timesteps (e.g., segments) can be used to obtain a WER for a specific time duration. In some embodiments, the backend neural network is a CNN with two layers and one pooling layer between the two layers. The first CNN layer can have a filter size of 3 and the second layer can have a filter size of 5. The number of outputs of the second layer is equal to the number of engines being orchestrated (e.g., classification). Orchestration can include a process that classifies how accurate each engine of a collection of engines transcribes an audio segment based on the raw audio features of the audio segment. In other words, preemptively orchestration can involve the pairing of a plurality of media segments with corresponding best transcription engines based at least on extracted audio features of each segment. For instance, each audio segment can be paired with one or more best transcription engines by the backend CNN (e.g., orchestrator).

In some embodiments, outputs from the last layer of frontend neural network (e.g., deep speech) are used as inputs to the backend CNN. For example, outputs from the fifth layer of the deep speech neural network can be used as inputs to the backend CNN. Outputs from the fifth layer of the deep speech neural network can have 2048 features per time step. The number of channels (one for each of the 2048 features) in between the two layers is a free parameter. Accordingly, there can be a lot of parameters due to the 2048 input channels, which leads to a CNN with very large dimensions.

In some embodiments, to deal with the large dimensions in the backend CNN, a dimension reduction layer is used. The dimension reduction layer can be a CNN layer with a filter size of 1. This is equivalent to a fully connected layer that operates independently on each time step. In this embodiment, the number of parameters can scale as $n_{in} \times n_{out}$. This can be beneficial because the number of parameters is not a product (multiple) of the filter size.

Accordingly, in some embodiments, the backend CNN can be a three-layer CNN with one dimension-reduction layer followed by a layer with filter size 3 and a layer with filter size 5. The number of parameters of this backend CNN can be: $2048 \times n_1 + n_1 \times n_2 \times 3 + n_2 \times n_{engines} \times 5$. $n_1$ and $n_2$ could be independent since the number of parameters will still largely be determined by $n_1$. In some embodiments, $n_2$ can be equal to $n_1$.

Using Different Output Layers of Frontend Neural Network as Inputs

As previously described, outputs from one or more layers of the frontend neural network (e.g., speech recognition neural network) can be used as inputs to the backend neural network (e.g., engine prediction neural network). In some embodiments, only outputs from the last hidden layer are used as inputs to the backend neural network. In some embodiments, the first and last hidden layers can be used as inputs for the backend neural network. In another example, outputs from the second and the penultimate hidden layers can be used as inputs to the backend neural network. Outputs from other combinations of layers are contemplated and are within the scope of this disclosure. For example, outputs from the first and fourth layers can be used as inputs. In another example, outputs from the second and fifth layers can also be used.

Figure 9:
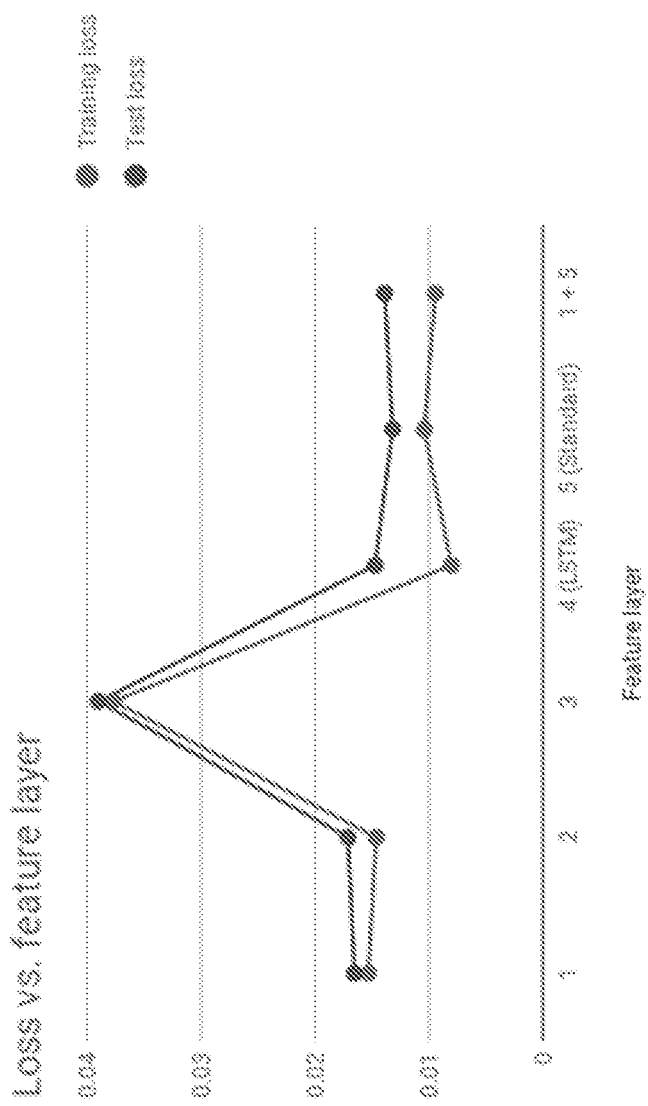
FIG. 9 is a chart illustrating empirical data of loss vs outputs of layer used in accordance with some aspects of the disclosure.

FIG. 9 illustrates the loss vs. outputs of layer(s) (used as inputs to the backend neural network). To generate the data of FIG. 9, the backend CNN structure and parameters are kept constant while the source of its inputs are changed. For example, outputs only from the first, second, third, fourth or fifth layer were used as inputs. A combination of outputs from layer 1 and 5 were as used as inputs to the backend CNN. The CNN structured was unchanged (except for layer 4 which has 4096 outputs due to the forward and backward LSTMs and the 1+5 combination which similarly also has 4096 outputs) but it was retrained in each case.

As shown in FIG. 9, outputs from layer 5 appear to provide the best results (though the results are within a margin of error). Additionally, the last point shows the combined features of layers 1 and 5 as inputs. Here, the larger gap between the training loss and the test loss can imply that there exists some overfitting.

Autoencoders

As in many neural networks, overfitting can be an issue. Overfitting occurs when the training data set is smaller than an equivalent data set. In transcription, the number of outputs is effectively reduced to a single number (the word error rate) per engine per audio segment. With a large number of features (e.g., input features) being extracted from the frontend neural network, the number of parameters in the frontend neural network is similarly large as the number of parameters in a layer, which scales as the product of the input and output features. In other words, the number of input channels can be very large and can approach an impractical large value.

In some embodiments, the number of input channels can be reduced without the need to re-train the entire frontend neural network, while keeping 2048 input features per time step in one layer constant, by using an autoencoder.

An autoencoder is a feed-forward network that takes a signal and applies a transformation to modify an intermediate state, and then applies another transformation to reproduce the original signal. In some embodiments, additional restrictions can be placed on that intermediate state. In this embodiment, the restriction can impose the intermediate state to have a lower dimension than the original signal. In other words, the autoencoder can be a dimension reduction autoencoder as it is forced to represent the original signal in a lower dimensional space while learning the most dominant features of that signal.

Autoencoders can be trained using the signal itself, no external ground truth is required. Furthermore, the effective amount of training data scales well with the dimensionality of the signal. In some embodiments, autoencoder can be used to reduce the 2048 input features per time step (and roughly 500 time steps per audio file) to a single number per engine. During the training process, the autoencoder starts with 2048 features per time step. This translates to roughly five orders of magnitude more training data based on the same quantity of raw audio for the autoencoder as compared to the orchestrator. With that much training data overfitting is not an issue. The autoencoder can be trained independently and accurately apart from the training of the backend neural network. And a good autoencoder can reduce the dimensionality of the signal without losing much information and this reduced dimensionality translates directly into fewer parameters in our orchestration model which reduces the potential for overfitting.

Figure 10:
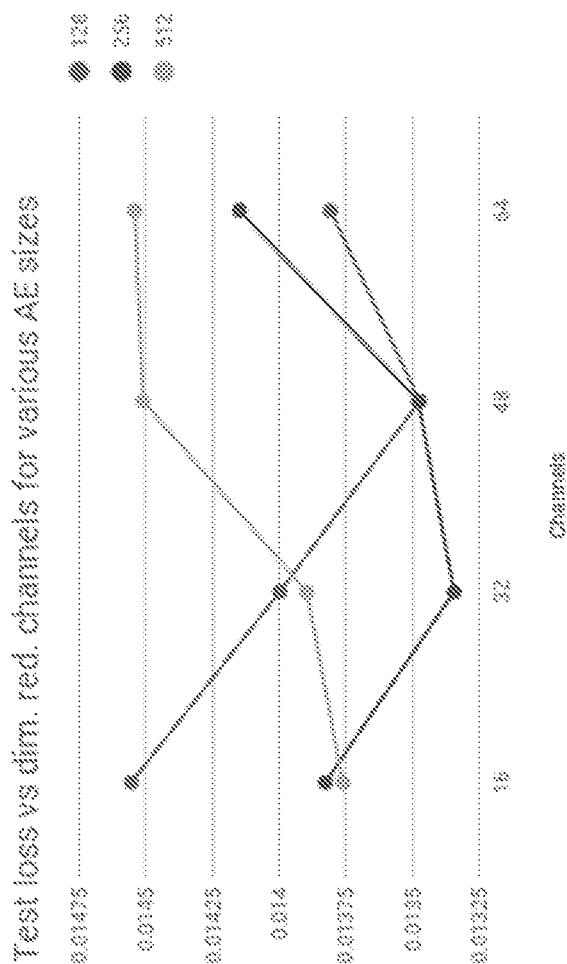
FIG. 10 is a chart illustrating empirical data of loss vs the channel size of the autoencoder neural network in accordance with some aspects of the disclosure.

FIG. 10 shows losses on the test set for various sizes of autoencoder vs the number of channels in the output of the first layer in the orchestration network. It should be noted that the number of parameters (and therefore the potential for overfitting) scales roughly as the product of the input and output channels. Further, more output channels mean more information is being carried over to the rest of the network and can potentially lead to more accurate predictions.

As shown in FIG. 10, there is a sweet spot for each size of autoencoder which balances these two factors. Exactly where the sweet spot occurs can vary with the size of the autoencoder model. However, as expected, a smaller autoencoder benefits more from more output channels. In some embodiments, an autoencoder having 256 channels is selected, which yields the best overall results.

Figure 11:
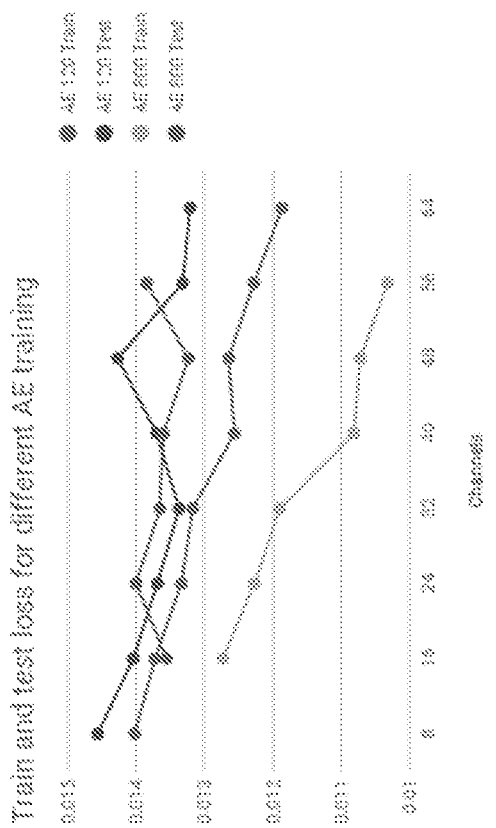
FIG. 11 is a chart illustrating empirical data of loss vs training time and channel size of the autoencoder neural network in accordance with some aspects of the disclosure.

During trial runs to collect empirical data, reasonable results can be obtained after around 100 epochs of training. To determine whether results would improve with more training, the autoencoder was trained for a much longer time, around 800 epochs. FIG. 11 shows the losses for the training and testing trail runs for various numbers of channel. As shown in FIG. 11, training the autoencoder for longer can translate to lower losses for the autoencoder, and there was no sign of overfitting. Autoencoder which was trained for longer was producing a more accurate representation of the signal. One speculation for this result is that accuracy itself is the problem. Having a less accurate representation of the original signal effectively means that noise is added to the system. Here, noise itself can be thought of as a kind of regulation that prevents overfitting much in the same way as a dropout of a term. In conclusion, the results do seem to indicate that there is little value to having a finely tuned autoencoder model.

Example Systems

Figure 12:
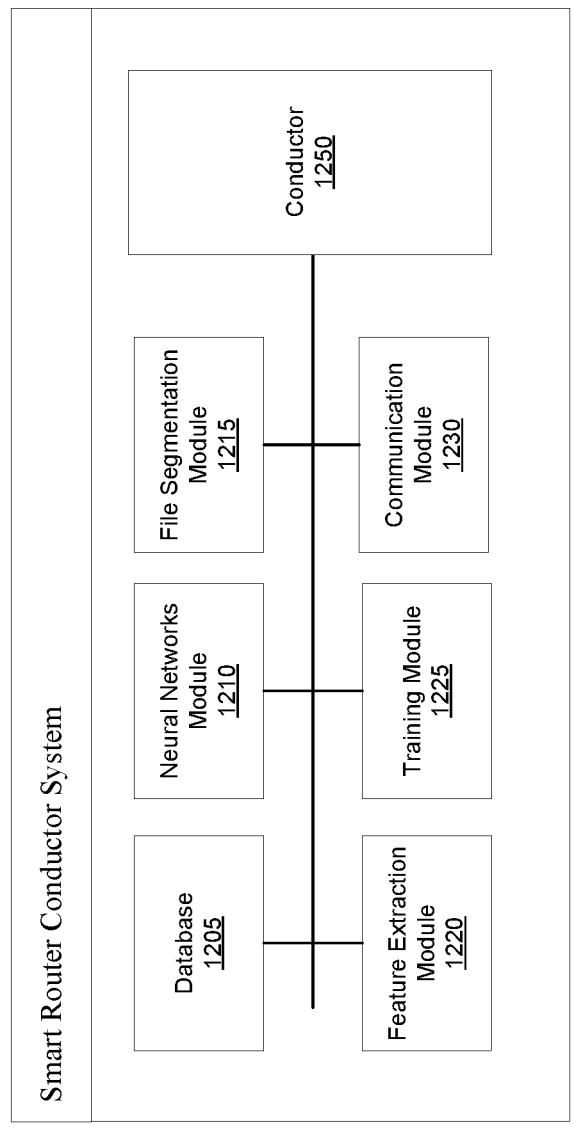
FIG. 12 is a block diagram illustrating the smart router conductor system in accordance with an aspect of the disclosure.

FIG. 12 is a system diagram of an exemplary smart router conductor system 1200 for training one or more neural networks and performing transcription using the trained one or more neural networks in accordance with some embodiments of the present disclosure. System 1200 may include a database 1205, file segmentation module 1210, neural networks module 1215, feature extraction module 1220, training module 1225, communication module 1230, and conductor 1150. System 1200 may reside on a single server or may be distributed at various locations on a network. For example, one or more components or modules (e.g., 1205, 1210, 1215, etc.) of system 1200 may be distributed across various locations throughout a network. Each component or module of system 1200 may communicate with each other and with external entities via communication module 1230. Each component or module of system 1200 may include its own sub-communication module to further facilitate with intra and/or inter-system communication.

Database 1205 can include training data sets and customers ingested data. Database 1205 can also include data collected by a data aggregator (not shown) that automatically collects and index data from various sources such as the Internet, broadcasted radio stations, broadcasted TV stations, etc.

File segmentation module 1210 includes algorithms and instructions that, when executed by a processor, cause the processor to segment a media file into a plurality of segments as described above with respect to at least subprocess 305 of FIG. 3A, 355 of subprocess 350, and subprocess 405 of FIG. 4.

Neural networks module 1215 can be an ecosystem of neural networks that includes a hybrid deep neural network (e.g., neural network 500), pre-trained speech recognition neural networks (e.g., neural network 550), engine prediction neural network (e.g., neural network 560), transcription neural networks (e.g., engines), other classification neural networks of varying architectures. Transcription engines can include local transcription engine(s) and third-party transcription engines such as engines provided by IBM®, Microsoft®, and Nuance®, for example.

Feature extraction module 1220 includes algorithms and instructions that, when executed by a processor, cause the processor to extract audio features of each media segment as described above with respect to at least subprocesses 310 and 410 of FIGS. 3 and 4, respectively. Feature extraction module 1220 can work in conjunction with other modules of system 1200 to perform the audio feature extraction as described in subprocesses 110 and 210. For example, feature extraction module 1220 and neural networks module 1210 can be configured to cooperatively perform the functions of subprocesses 310 and 410. Additionally, neural networks module 1210 and feature extraction module 1220 can share or have overlapping responsibilities and functions.

Training module 1220 includes algorithms and instructions that, when executed by a processor, cause the processor to perform the respective functions and features of at least subprocesses 415, 420, and 425 of FIG. 1. For example, training module 1220 can be configured to train a neural network to predict the WER of an engine for each segment based at least on audio features of each segment by mapping the engine WER of each segment to audio features of the segment. Training module 1220 can also be configured to train an engine prediction neural network to associate image features with an engine's classification performance.

Conductor 1250 includes algorithms and instructions that, when executed by a processor, cause the processor to perform the respective the functions and features of the smart router conductor as describe above with respect, but not limited, to processes 100, 200, 300, 400, 600, and 700. For example, conductor 1250 includes algorithms and instructions that, when executed by a processor, cause the processor to: segment the media file into a plurality of segments; extract, using a first neural network, audio features of a first and second segment of the plurality of segments; and identify, using a second neural network, a best-candidate engine for each of the first and second segments based at least on audio features of the first and second segments.

In another example, conductor 1250 includes algorithms and instructions that, when executed by a processor, cause the processor to: segment the audio file into a plurality of audio segments; use a first audio segment of the plurality of audio segments as inputs to a deep neural network; and use outputs of one or more hidden layers of the deep neural network as inputs to a second neural network that is trained to identify a first transcription engine having a highest predicted transcription accuracy among a group of transcription engines for the first audio segment based at least on the outputs of the one or more hidden layers of the deep neural network.

In yet another example, conductor 1250 includes algorithms and instructions that, when executed by a processor, cause the processor to: segment a ground truth image file into one or more image portions; extract image features of the one or more image portions using outputs of one or more hidden layers of an image classification neural network; classify the ground truth image using a plurality of image classification engines; train an engine prediction neural network to associate the extracted image features of the ground truth image with the classification performance (e.g., accuracy score) of each of the plurality of image classification engines.

In yet another example, conductor 1250 includes algorithms and instructions that, when executed by a processor, cause the processor to: segment an image file into one or more image portions; extract image features of the one or more image portions using outputs of one or more hidden layers of an image classification neural network; use the extracted image features as input to a trained engine prediction neural network to generate a list of best candidate image classification engines.

It should be noted that one or more functions of each of the modules (e.g., 1205, 1210, 1215, 1220, 1225, 1230) in transcription system 1200 can be shared with another modules within transcription system 1200.

Figure 13:
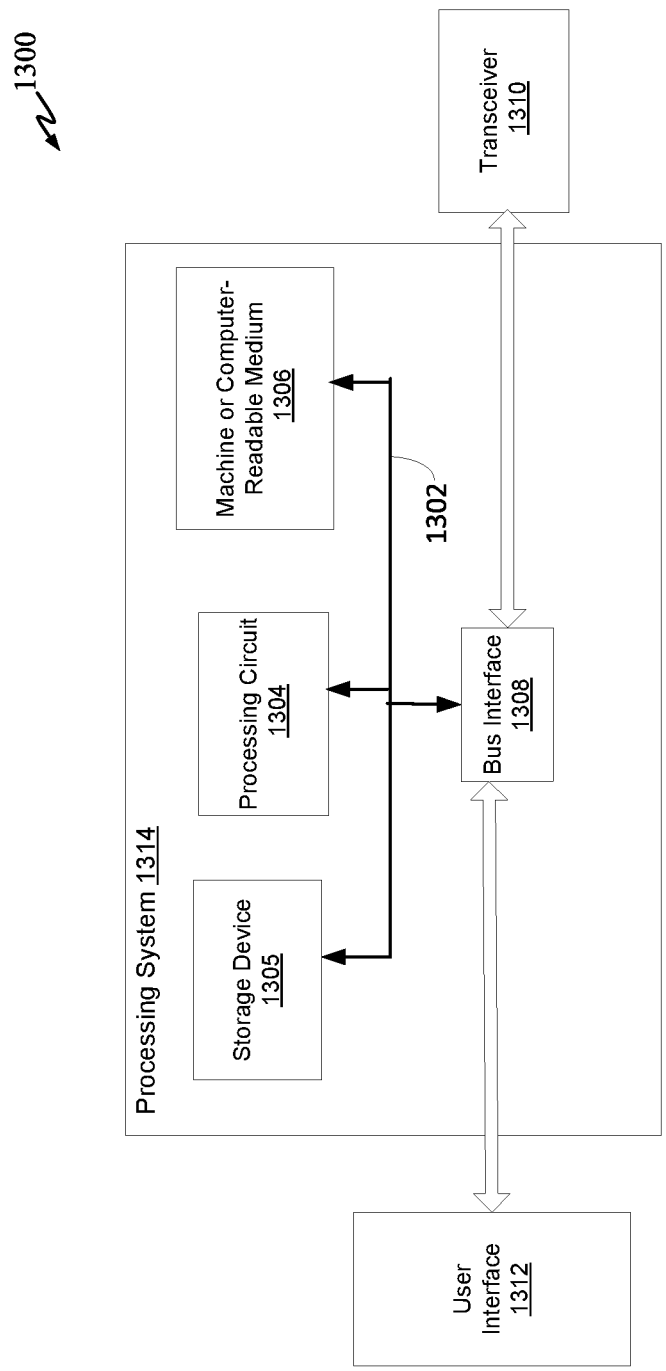
FIG. 13 is a diagram illustrating an exemplary hardware implementation of the smart router conductor system in accordance with some aspects of the disclosure.

FIG. 13 illustrates an exemplary system or apparatus 1300 in which processes 100 and 200 can be implemented. In accordance with various aspects of the disclosure, an element, or any portion of an element, or any combination of elements may be implemented with a processing system 1314 that includes one or more processing circuits 1304. Processing circuits 1304 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 1304 may be used to implement any one or more of the processes described above and illustrated in FIGS. 1-4, 6, and 7.

In the example of FIG. 13, the processing system 1314 may be implemented with a bus architecture, represented generally by the bus 1302. The bus 1302 may include any number of interconnecting buses and bridges depending on the specific application of the processing system 1314 and the overall design constraints. The bus 1302 may link various circuits including one or more processing circuits (represented generally by the processing circuit 1304), the storage device 1305, and a machine-readable, processor-readable, processing circuit-readable or computer-readable media (represented generally by a non-transitory machine-readable medium 1306). The bus 1302 may also link various other circuits such as, but not limited to, timing sources, peripherals, voltage regulators, and power management circuits, which are well known in the art, and therefore, will not be described any further. The bus interface 1308 may provide an interface between bus 1302 and a transceiver 1310. The transceiver 1310 may provide a means for communicating with various other apparatus over a transmission medium. Depending upon the nature of the apparatus, a user interface 1312 (e.g., keypad, display, speaker, microphone, touchscreen, motion sensor) may also be provided.

The processing circuit 1304 may be responsible for managing the bus 1302 and for general processing, including the execution of software stored on the machine-readable medium 1306. The software, when executed by processing circuit 1304, causes processing system 1314 to perform the various functions described herein for any particular apparatus. Machine-readable medium 1306 may also be used for storing data that is manipulated by processing circuit 1304 when executing software.

One or more processing circuits 1304 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1306. The machine-readable medium 1306 may be a non-transitory machine-readable medium. A non-transitory processing circuit-readable, machine-readable or computer-readable medium includes, by way of example, a magnetic storage device (e.g., solid state drive, hard disk, floppy disk, magnetic strip), an optical disk (e.g., digital versatile disc (DVD), Blu-Ray disc), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as, but not limited to, portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1306 may reside in the processing system 1314, external to the processing system 1314, or distributed across multiple entities including the processing system 1314. The machine-readable medium 1306 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

Further Discussion of Example Embodiments

In a first example method for classifying a first media segment of a first data type having a corresponding media segment of a second data type, the method includes: extracting a first set of media features of the first media segment of the first data type; generating, using an engine prediction neural network, a best candidate neural network based at least on the first set of media features; determining whether a predicted value of accuracy of the best candidate neural network is above a predetermined accuracy threshold; when the predicted value of accuracy of the best candidate neural network is below the predetermined accuracy threshold, classifying the corresponding media segment of a second data type using a second classification neural network; and selecting, based at least on results of the classification of the corresponding media segment of a second data type, a third classification neural network to classify the first media segment of the first data type.

In the first example method, the best candidate neural network can be a neural network having a highest predicted value of accuracy. The first and second data types can be data of different classes. For example, the first type of data can be audio data and the second type of data can be image data or metadata. The third classification neural network and the best candidate neural network are different.

In a first aspect of the first example method, extracting the first set of media features of the first data type comprises extracting audio features of the first media segment using outputs of one or more layers of a speech-to-text classification neural network. The first data type comprises audio data and the corresponding media segment of second data type comprises image data, transcription data, or metadata. The corresponding media segment can span a duration of 30 seconds before and after from when the first media segment occurs within a multimedia file.

In a second aspect of the first example method, extracting the first set of media features of the first data type comprises extracting image features of the first media segment using outputs of one or more layers of an image classification neural network. The first data type comprises image data and the corresponding media segment of second data type comprises audio data, transcription data, or metadata. The second aspect of the first example method may be implemented in combination with the first aspect of the second example method, though the example embodiments are not limited in this respect.

In a third aspect of the first example method, the first example method can further include: classifying the corresponding media segment of a second data type using the second classification neural network comprising: extracting a second set of media features of the corresponding media segment of the second data type; and generating, using the engine prediction neural network, a best candidate neural network based at least on the second set of media features. The second classification neural network comprises the best candidate neural network. The third aspect of the first example method may be implemented in combination with the first and/or second aspect of the first example method, though the example embodiments are not limited in this respect.

In a fourth aspect of the first example method, extracting the first set of media features of the first data type comprises extracting the first set of media features of the first media segment using outputs of one or more hidden layers of a fourth classification neural network trained to classify data of the first data type. The first data type comprises audio data, image data, transcription data, or metadata. The engine prediction neural network can be pre-trained to associate outputs of the one or more hidden layers of the fourth classification neural network with predicted classification performances of a plurality of neural network. The fourth aspect of the first example method may be implemented in combination with the first, second, and/or third aspect of the first example method, though the example embodiments are not limited in this respect.

In a fifth aspect of the first example method, selecting the third image classification neural network can include: determining context of the corresponding media segment based at least on the classification result of the corresponding media segment received from the second classification neural network; and selecting the third classification neural network based on the determined context. The fifth aspect of the first example method may be implemented in combination with the first, second, third, and/or fourth aspect of the first example method, though the example embodiments are not limited in this respect.

Conclusion

One or more of the components, processes, features, and/or functions illustrated in the figures may be rearranged and/or combined into a single component, block, feature or function or embodied in several components, steps, or functions. Additional elements, components, processes, and/or functions may also be added without departing from the disclosure. The apparatus, devices, and/or components illustrated in the Figures may be configured to perform one or more of the methods, features, or processes described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The embodiments described above are considered novel over the prior art and are considered critical to the operation of at least one aspect of the disclosure and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

What is claimed is:

1. A method for classifying a first media segment of a first data type having a corresponding media segment of a second data type, the method comprising:
    extracting a first set of media features of the first media segment of the first data type;
    generating, using an engine prediction neural network, a best candidate neural network based at least on the first set of media features, wherein the best candidate neural network comprises a neural network having a highest predicted value of accuracy;
    determining whether a predicted value of accuracy of the best candidate neural network is above a predetermined accuracy threshold;
    when the predicted value of accuracy of the best candidate neural network is below the predetermined accuracy threshold, classifying the corresponding media segment of a second data type using a second classification neural network; and
    selecting, based at least on results of the classification of the corresponding media segment of a second data type, a third classification neural network to classify the first media segment of the first data type, wherein the first and second data types are different, and wherein the third classification neural network and the best candidate neural network are different.

2. The method of claim 1, wherein extracting the first set of media features of the first data type comprises extracting audio features of the first media segment using outputs of one or more layers of a speech-to-text classification neural network, wherein the first data type comprises audio data and the corresponding media segment of second data type comprises image data, transcription data, or metadata.

3. The method of claim 2, wherein the corresponding media segment spans a duration of 30 seconds before and after from when the first media segment occurs within a multimedia file.

4. The method of claim 1, wherein extracting the first set of media features of the first data type comprises extracting image features of the first media segment using outputs of one or more layers of an image classification neural network, wherein the first data type comprises image data and the corresponding media segment of second data type comprises audio data, transcription data, or metadata.

5. The method of claim 1, further classifying the corresponding media segment of a second data type using the second classification neural network comprising:
    extracting a second set of media features of the corresponding media segment of the second data type; and
    generating, using the engine prediction neural network, a best candidate neural network based at least on the second set of media features, wherein the second classification neural network comprises the best candidate neural network.

6. The method of claim 1, wherein extracting the first set of media features of the first data type comprises extracting the first set of media features of the first media segment using outputs of one or more hidden layers of a fourth classification neural network trained to classify data of the first data type, wherein the first data type comprises audio data, image data, transcription data, or metadata.

7. The method of claim 6, wherein the engine prediction neural network is trained to associate outputs of the one or more hidden layers of the fourth classification neural network with predicted classification performances of a plurality of neural network.

8. The method of claim 6, wherein the first set of media features is extracted from a last hidden layer of the fourth classification neural network.

9. The method of claim 6, wherein the first set of media features is extracted from a first and last hidden layer of the fourth classification neural network.

10. The method of claim 1, wherein selecting the third image classification neural network comprises:
    determining context of the corresponding media segment based at least on the classification result of the corresponding media segment received from the second classification neural network; and
    selecting the third classification neural network based on the determined context.

11. A system for classifying a first media segment of a first data type having a corresponding media segment of a second data type, the system comprising:
    a memory;
    one or more processors coupled to the memory, the one or more processors configured to:
        extract a first set of media features of the first media segment of the first data type;
        generate, using an engine prediction neural network, a best candidate neural network based at least on the first set of media features, wherein the best candidate neural network comprises a neural network having a highest predicted value of accuracy;
        determine whether a predicted value of accuracy of the best candidate neural network is above a predetermined accuracy threshold;
        when the predicted value of accuracy of the best candidate neural network is below the predetermined accuracy threshold, classify the corresponding media segment of a second data type using a second classification neural network; and
        select, based at least on results of the classification of the corresponding media segment of a second data type, a third classification neural network to classify the first media segment of the first data type, wherein the first and second data types are different, and wherein the third classification neural network and the best candidate neural network are different.

* * * * *